(12) United States Patent
Gokhale et al.

(10) Patent No.: US 12,346,652 B2
(45) Date of Patent: Jul. 1, 2025

(54) SYSTEM(S) AND METHOD(S) FOR CAUSING CONTEXTUALLY RELEVANT EMOJI(S) TO BE VISUALLY RENDERED FOR PRESENTATION TO USER(S) IN SMART DICTATION

(71) Applicant: GOOGLE LLC, Mountain View, CA (US)

(72) Inventors: Ajay Gokhale, Los Angeles, CA (US); Jiawei Chen, Mountain View, CA (US); Alvin Abdagic, Zurich (CH); Adrien Olczak, Irvine, CA (US); Alessandro Agostini, Zurich (CH); Alexander Robertson, Edinburgh (GB); Cristian Udrescu, Zurich (CH); Jackie Xiang, Sunnyvale, CA (US); Jennifer Daniel, Brooklyn, NY (US); Keqian Yan, Shanghai (CN); Mehek Sharma, Thalwil (CH); Nicolo D'Ercole, Oberrieden (CH); Yang Lu, San Jose, CA (US); Dror Ayalon, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 255 days.

(21) Appl. No.: 17/957,489

(22) Filed: Sep. 30, 2022

(65) Prior Publication Data
US 2024/0078374 A1 Mar. 7, 2024

Related U.S. Application Data

(60) Provisional application No. 63/403,807, filed on Sep. 5, 2022.

(51) Int. Cl.
*G06F 40/166* (2020.01)
*G06F 3/0482* (2013.01)
(Continued)

(52) U.S. Cl.
CPC .......... *G06F 40/166* (2020.01); *G06F 3/0482* (2013.01); *G06F 3/0488* (2013.01);
(Continued)

(58) Field of Classification Search
CPC .... G06F 40/166; G06F 40/279; G06F 3/0482; G10L 15/22; G10L 25/63; G10L 2015/223
See application file for complete search history.

(56) References Cited

U.S. PATENT DOCUMENTS 6,813,603 B1 11/2004 Groner et al.
2002/0143533 A1 10/2002 Lucas et al.
(Continued)

FOREIGN PATENT DOCUMENTS

AU 2015101183 A4 * 10/2015 ....... G06F 17/30905
EP 2339576 6/2011
(Continued)

OTHER PUBLICATIONS

Clover, Juli; Everything New with Siri and Dictation in iOS 16; https://www.macrumors.com/guide/ios-16-siri/; dated Sep. 14, 2022.
(Continued)

*Primary Examiner* — Mohammad K Islam
(74) *Attorney, Agent, or Firm* — Gray Ice Higdon

(57) ABSTRACT

Implementations described herein relate to causing emoji(s) that are associated with a given emotion class expressed by a spoken utterance to be visually rendered for presentation to a user at a display of a client device of the user. Processor(s) of the client device may receive audio data that captures the spoken utterance, process the audio data to generate textual data that is predicted to correspond to the spoken utterance, and cause a transcription of the textual data to be visually rendered for presentation to the user via the display. Further, the processor(s) may determine, based
(Continued)

on processing the textual data, whether the spoken utterance expresses a given emotion class. In response to determining that the spoken utterance expresses the given emotion class, the processor(s) may cause emoji(s) that are stored in association with the given emotion class to be visually rendered for presentation to the user via the display.

19 Claims, 11 Drawing Sheets

(51) Int. Cl.
*G06F 3/0488* (2022.01)
*G06F 40/279* (2020.01)
*G10L 15/197* (2013.01)
*G10L 15/22* (2006.01)
*G10L 25/63* (2013.01)

(52) U.S. Cl.
CPC .......... *G06F 40/279* (2020.01); *G10L 15/197* (2013.01); *G10L 15/22* (2013.01); *G10L 25/63* (2013.01); *G10L 2015/223* (2013.01)

(56) References Cited

U.S. PATENT DOCUMENTS

| | | | |
|---|---|---|---|
| 2006/0064302 | A1 | 3/2006 | Ativanichayaphong et al. |
| 2014/0343950 | A1 | 11/2014 | Simpson et al. |
| 2017/0185581 | A1 | 6/2017 | Bojja |
| 2018/0218033 | A1 | 8/2018 | Utla et al. |
| 2019/0121532 | A1* | 4/2019 | Strader .................. G10L 15/26 |
| 2019/0221208 | A1* | 7/2019 | Chen ...................... G06F 3/167 |
| 2020/0175987 | A1* | 6/2020 | Thomson ................ G10L 15/26 |
| 2022/0343576 | A1* | 10/2022 | Marey .................... G10L 25/63 |
| 2022/0358701 | A1* | 11/2022 | Brandon ............... G06F 3/1423 |
| 2023/0007359 | A1* | 1/2023 | Aher ................. H04N 21/4532 |
| 2023/0154172 | A1* | 5/2023 | Wasnik ............... G06V 10/811 382/157 |

FOREIGN PATENT DOCUMENTS

| | | | | |
|---|---|---|---|---|
| WO | 2016057437 | | 4/2016 | |
| WO | WO-2017160341 | A1 * | 9/2017 | ............. G06F 17/24 |

OTHER PUBLICATIONS

European Patent Office; International Search Report and Written Opinion issued in Application No. PCT/US2023/024583; 12 pages; dated Aug. 24, 2023.

\* cited by examiner

SYSTEM(S) AND METHOD(S) FOR CAUSING CONTEXTUALLY RELEVANT EMOJI(S) TO BE VISUALLY RENDERED FOR PRESENTATION TO USER(S) IN SMART DICTATION

BACKGROUND

Humans can engage in human-to-computer dialog sessions with interactive software applications referred to herein as "automated assistants" (also referred to as "chat bots," "interactive personal assistants," "intelligent personal assistants," "personal voice assistants," "conversational agents," etc.). For example, a human (which when interacting with an automated assistant may be referred to as a "user") may provide an input (e.g., commands, queries, and/or requests) to the automated assistant that can cause the automated assistant to generate and provide responsive output, to control one or more Internet of things (IoT) devices, and/or to perform one or more other functionalities. The input provided by the user can be, for example, spoken natural language input (i.e., spoken utterances) which may in some cases be converted into text (or other semantic representation) and then further processed, and/or typed natural language input.

Automated assistants typically rely upon a pipeline of components in interpreting and responding to user inputs. For example, an automatic speech recognition (ASR) engine can be used to process audio data that captures a spoken utterance of a user, and to generate ASR output, such as a transcription (i.e., sequence of term(s) and/or other token(s)) of the spoken utterance. Further, a natural language understanding (NLU) engine can be used to process the ASR output, and to generate NLU output, such as an intent of the user in providing the spoken utterance and optionally slot value(s) for parameter(s) associated with the intent. Moreover, a fulfillment engine can be used to process the NLU output, and to generate fulfillment output, such as a structured request to obtain content that is responsive to the spoken utterance or cause some action to be performed responsive to the spoken utterance.

In some cases, automated assistants may be utilized to dictate transcriptions for a variety of different purposes. For example, a user can provide spoken utterances to the automated assistant, and the automated assistant can process, using the ASR engine, the spoken utterances to generate the transcriptions as text messages, e-mails, notes, and any other text for utilization by respective software applications or an automated assistant application associated with the automated assistant. In some of these cases, the spoken utterances received while the automated assistant is dictating text on behalf of the user may express various emotions. While some automated assistants may enable users to provide explicit spoken utterances to obtain emojis or other visual content related to particular emotions, these automated assistants may not be able to suggest these emojis or other visual content absent these explicit spoken utterances. As a result, users may have to manually provide additional inputs (e.g., via a corresponding keyboard of these client devices) to obtain these emojis, thereby increasing a quantity of user inputs received at client devices, prolonging the human-to-computer dialog session, and wasting computational resources.

SUMMARY

Implementations described herein relate to causing one or more emojis to be visually rendered for presentation to a user of a client device while the user dictating spoken utterance(s). For instance, processor(s) of the client device may receive audio data that captures a spoken utterance of the user, and process, using an automatic speech recognition (ASR) model, the audio data that captures the spoken utterance to generate textual data that is predicted to correspond to the spoken utterance. Further, the processor(s) of the client device may cause a transcription that includes the textual data that is predicted to correspond to the spoken utterance to be visually rendered for presentation to the user via a display of the client device (e.g., as dictated text during a dictation session between the user and an automated assistant executing at least in part at the client device). Moreover, the processor(s) of the client device may determine, based on processing at least the textual data that is predicted to correspond to the spoken utterance, whether the spoken utterance expresses a given emotion class from among a plurality of disparate emotion classes. In response to determining that the spoken utterance expresses a given emotion class, from among the plurality of disparate emotion classes, the processor(s) of the client device may cause emoji(s) stored in association with the given emotion class to be visually rendered for presentation to the user. The emoji(s) may be selectable such that a user selection of a given emoji, from among the emoji(s), causes the given emoji to be incorporated into the transcription that includes the textual data that is predicted to correspond to the spoken utterance. Accordingly, techniques described herein enable the user to quickly and efficiently supplement the dictated text with contextually relevant emoji(s) (e.g., via a single tap or a single voice command that selects the given emoji) such that the transcription more accurately reflects the emotion expressed by the user in providing the spoken utterance.

For example, assume that the user of the client device receives an incoming electronic communication (e.g., a text message, an email, a social media message, etc.) from an additional user that says "what are your plans for the day?", and the automated assistant to dictate, on behalf of the user, a reply electronic communication that is responsive to the incoming electronic communication. Further assume that the user provides a spoken utterance of "Thankfully I'm headed to the beach for vacation this evening!". In this example, the processor(s) of the client device may receive audio data that captures the spoken utterance, process the audio data, using the ASR model, to generate textual data that is predicted to correspond to the spoken utterance (e.g., textual data of "Thankfully I'm headed to the beach for vacation this evening!"), and cause the textual data to be incorporated into a transcription of the reply electronic communication that is responsive to the incoming electronic communication that is visually rendered for presentation to the user at the display of the client device. Further assume that the processor(s) of the client device determine that the spoken utterance expresses an "excitement" emotion class as the given emotion class. Accordingly, in this example, the processor(s) of the client device may further cause one or more emojis that are stored in association with the "excitement" emotion class to be visually rendered for presentation to the user at the display of the client device, such as an "excited face" emoji, an "exclamation mark" emoji, or the like. This enables the user to select one or more of the emojis, that are stored in associated with the "excitement" emotion class, for inclusion in the transcription to further convey the excitement expressed by the user in providing the spoken utterance.

In various implementations, and in response to determining that the spoken utterance does not express a given emotion class or that the spoken utterance expresses multiple emotion classes, the processor(s) of the client device may determine whether there are emoji(s) stored in association with term(s) included in the spoken utterance. In response to determining that there are emoji(s) stored in association with the term(s) included in the spoken utterance, the processor(s) of the client device may cause the emoji(s) that are stored in association with the term(s) included in the spoken utterance to be visually rendered for presentation to the user. In contrast with the above example, assume that the processor(s) of the client device determine that the spoken utterances does not express the "excitement" emotion class (or any other given emotion class). In this example, the processor(s) of the client device may determine whether one or more of the terms included in the spoken utterance are stored in association (e.g., stored in association with the term "Thankfully", "beach", "vacation", "evening", or any other terms included in the spoken utterance). Accordingly, in this example, and although the processor(s) of the client device may have determined that the spoken utterance does not express a given emotion class or that the spoken utterance expresses multiple emotion classes, the processor(s) of the client device may further cause one or more emojis that are stored in associated with one or more of the terms of the spoken utterance to be visually rendered for presentation to the user at the display of the client device, such as a "beach" emoji and/or "sun" emoji associated with the term "beach" that was included in the spoken utterance, a "plane" emoji associated with the term "vacation" that was included in the spoken utterance, or the like. This enables the user to select one or more of the emojis, that are stored in association with one or more of the terms of the spoken utterance, for inclusion in the transcription to further convey one or more of the terms expressed by the user in providing the spoken utterance.

In some versions of those implementations, and in response to determining that there are no emoji(s) stored in association with term(s) included in the spoken utterance, the processor(s) of the client device may cause command(s) that are associated with the transcription to be visually rendered for presentation to the user. In contrast with the above example, assume that the processor(s) of the client device determine that the spoken utterances does not express the "excitement" emotion class (or any other given emotion class), and further assume that the processor(s) of the client device determine that no emoji(s) are stored in association with any of the term(s) included in the spoken utterance (e.g., no emoji(s) stored in association with the term "Thankfully", "beach", "vacation", "evening", or any other terms included in the spoken utterance). In this example, the processor(s) of the client device may cause command(s) to be visually rendered for presentation to the user at the display of the client device. The command(s) may be selectable (e.g., via a voice selection, a touch selection, or the like) to cause one or more operations associated with the transcription to be performed. For instance, the command(s) may include a "send" command that causes the transcription to be transmitted to an additional client device over one or more networks, an "edit" command that causes the automated assistant to initiate an editing mode for the transcription, a "cancel" command that causes the reply electronic communication to be cancelled, and/or other commands.

In additional or alternative implementations, the processor(s) of the client device may cause the voice command(s) that are associated with the transcription to be visually rendered for presentation to the user in response to determining that the spoken utterance does not express a given emotion class or that the spoken utterance expresses multiple emotion classes and without determining whether there are emoji(s) stored in association with term(s) included in the spoken utterance. Put another way, the processor(s) may bypass determining whether there are emoji(s) stored in association with term(s) included in the spoken utterance in these additional or alternative implementations. However, it should be noted that the user may still manually add various emojis to the transcription (e.g., via interacting with a keyboard of the client device) and/or provide various voice commands to add various emojis to the transcription (e.g., by providing a command of "add beach emoji").

In various implementations, and in determining whether the spoken utterance expresses a given emotion class from among a plurality of disparate emotion classes, the processor(s) of the client device may process, using an emotion classifier, the textual data is predicted to correspond to the spoken utterance to generate emotion classifier output. Further, the processor(s) of the client device may determine, based on the emotion classifier output, a confidence value for the given emotion class, and may determine whether the spoken utterance expresses the given emotion class based on the confidence value for the given emotion class. For instance, the textual data that is predicted to correspond to the spoken utterance may be represented as a sequence of tokens, word2vec representation, or other representation that is provided as input across the emotion classifier to generate the emotion classifier output. In some of these instances, the emotion classifier may be trained to generate a confidence value distribution over the plurality of disparate emotion classes as the emotion classifier output, and the processor(s) of the client device may determine that the spoken utterance expresses the given emotion class based on the confidence value for the given emotion class satisfying a threshold confidence value. Accordingly, in these instances, the processor(s) of the client device may determine that the spoken utterance does not express any emotion class based on none of the confidence values of the distribution satisfying the threshold confidence value, or that the spoken utterance expresses multiple emotion classes based on multiple of the confidence values of the distribution satisfying the threshold confidence value (or other threshold confidence values). In other instances, the emotion classifier may be trained to generate an embedding that corresponds to a lower-level representation of the spoken utterance as the emotion classifier output. The embedding may be mapped to an embedding space, or other lower dimensional space, that enables the embedding to be compared to a plurality of previously generated embedding. In these instances, if the embedding is sufficiently close in the embedding space to another spoken utterance that expresses the given emotion class (e.g., determined based on Euclidean distance, cosine similarity, or other distance measures in the embedding space), then the spoken utterance may be considered to express the given emotion class. Accordingly, in these instances, the processor(s) of the client device may determine that the spoken utterance does not express any emotion class based on the embedding being too far away from any other previously generated embeddings in the embedding space, or that the spoken utterance expresses multiple emotion classes based on the embedding being within a threshold distance of multiple other previously generated embeddings in the embedding space.

In some versions of those implementations, the processor(s) of the client device may additionally or alternatively cause the emotion classifier to process the audio data that captures the spoken utterance to determine whether the spoken utterance expresses the given emotion class. In these implementations, one or more prosodic properties of the audio data (e.g., tone, intonation, rhythm, etc.) may inform the emotion classifier that the user is being sarcastic in providing the spoken utterance of "Thankfully I'm headed to the beach for vacation this evening!". Accordingly, in these implementations, the given emotion class may correspond to a "sarcastic" emotion class despite the underlying textual data that is predicted to correspond to the spoken utterance indicating that the user is, in fact, excited about the vacation.

In various implementations, the processor(s) of the client device may cause the emoji(s) that are stored in association with the given emotion class and/or the emoji(s) that are stored in associated with the term(s) included in the spoken utterance in response to determining that a threshold duration of time (e.g., 1 second, 1.5 seconds, 2 seconds, or the like) has lapsed with respect to the user providing the spoken utterance. Continuing with the above example, again assume that the user provides a spoken utterance of "Thankfully I'm headed to the beach for vacation this evening!", assume that the processor(s) of the client device determine that the spoken utterance expresses an "excitement" emotion class as the given emotion class that is stored in association with an "excited face" emoji, an "exclamation mark" emoji, or the like. However, in these implementations, the processor(s) of the client device may cause the "excited face" emoji, the "exclamation mark" emoji, or the like to be visually rendered for presentation to the user in response to determining that a threshold duration of time has lapsed since the user said "evening" (e.g., the last word the spoken utterance). In some versions of those implementations, the processor(s) of the client device may employ an endpointing technique or other technique to determine that the user has finished providing the spoken utterance.

In additional or alternative implementations, the processor(s) of the client device may cause the emoji(s) that are stored in association with the given emotion class and/or the emoji(s) that are stored in associated with the term(s) included in the spoken utterance without considering any threshold duration of time such that the emoji(s) are provided for presentation to the user in a streaming manner. However, this may result in distracting the user as the emoji(s) may be continually updated as the user provides the spoken utterance and cause the user to lose their train of thought. As a result, the user may be required to provide additional inputs and/or re-engage in a dictation session with the automated assistant, thereby unnecessarily wasting computational resources of the client device. Nonetheless, these implementations are also contemplated herein.

In additional or alternative implementations, the processor(s) of the client device may cause the emoji(s) that are stored in association with the given emotion class and/or the emoji(s) that are stored in associated with the term(s) included in the spoken utterance in response to determining that command(s) associated with the transcription have been received. Continuing with the above example, again assume that the user provides a spoken utterance of "Thankfully I'm headed to the beach for vacation this evening!", assume that the processor(s) of the client device determine that the spoken utterance expresses an "excitement" emotion class as the given emotion class that is stored in association with an "excited face" emoji, an "exclamation mark" emoji, or the like. Further assume that the user explicitly said "exclamation mark" after saying "evening". In these implementations, the processor(s) of the client device may cause the "excited face" emoji, the "exclamation mark" emoji, or the like to be visually rendered for presentation to the user in response to determining that the user provided an explicit command with respect to the transcription. Put another way, the processor(s) of the client device may consider the command of "exclamation mark" as an indication that the user has finished providing a thought via the spoken utterance and utilize this indication as a signal to cause these emojis to be proactively provided for presentation to the user. Although the above example is described with respect to the command of "exclamation mark", it should be understood that is for the sake of example and that other commands (e.g., a "next line" command, a "new paragraph" command, etc.) may also be utilized as signals to cause these emojis to be proactively provided for presentation to the user.

In various implementations, the user selection of the given emoji may be based on touch input of the user that is directed to the display of the client device. For example, the user may direct touch input to the given emoji (and any other emojis) to cause the given emoji (and any of the other emojis) to be incorporated into the transcription. In additional or alternative implementations, the user selection of the given emoji may be based on an additional spoken utterance of the user. In some versions of those implementations, the additional spoken utterance of the user may include a presentation order of the given emoji (e.g., "add the first emoji", "add the third emoji", or the like) that causes the given emoji to be incorporated into the transcription. In some versions of those implementations, the additional spoken utterance of the user may include a given emoji reference of the given emoji (e.g., "add the excited face emoji", "add the exclamation mark emoji", or the like) that causes the given emoji to be incorporated into the transcription. In these implementations, the processor(s) of the client device may bias ASR processing of additional audio data that captures the additional spoken utterance towards the given emoji reference and other emoji references of other emojis that are visually rendered for presentation to the user via the display of the client device.

In various implementations, and in response to determining that there are no user selections of any of the emoji(s) that are visually rendered for presentation to the user, the processor(s) of the client device may cause the command(s) that are associated with the transcription to be visually rendered for presentation to the user. In these implementations, the command(s) may supplant the emoji(s) at the display of the client device. The command(s) may be selectable (e.g., via a voice selection, a touch selection, or the like) to cause one or more operations associated with the transcription to be performed. For instance, the command(s) may include a "send" command that causes the transcription to be transmitted to an additional client device over one or more networks, an "edit" command that causes the automated assistant to initiate an editing mode for the transcription, a "cancel" command that causes the reply electronic communication to be cancelled, and/or other commands.

In various implementations, the transcription may be visually rendered for presentation to the user at a first portion of the display, but the emoji(s) and/or command(s) described here may be visually rendered for presentation to the user at a second, distinct portion of the display. In various implementations, and in response to determining that the spoken utterance expresses a given emotion class or that the spoken utterance expresses multiple emotion classes, the processor(s) of the client device may cause a reference of the given emotion class to be visually rendered for presentation to the user along with the emoji(s) that are stored in association with the given emotion class. This educates the user with respect to why the emoji(s) were provided for presentation. Continuing with the above example, again assume that the user provides a spoken utterance of "Thankfully I'm headed to the beach for vacation this evening!", assume that the processor(s) of the client device determine that the spoken utterance expresses an "excitement" emotion class as the given emotion class that is stored in association with an "excited face" emoji, an "exclamation mark" emoji, or the like. In this example, and in causing the emojis stored in association with the "excitement" emotion class, the processor(s) of the client device may also cause a reference of "excited emojis" or the like to be visually rendered along with the emojis at the display of the client device.

In various implementations, the processor(s) of the client device may receive additional audio data that captures an additional spoken utterance of the user, and process, using the ASR model, the additional audio data that captures the additional spoken utterance to generate additional textual data that is predicted to correspond to the additional spoken utterance. Further, the processor(s) of the client device may cause the additional textual data that is predicted to correspond to the additional spoken utterance to be incorporated into the transcription. Moreover, the processor(s) of the client device may determine, based on processing at least the additional textual data that is predicted to correspond to the additional spoken utterance, whether the additional spoken utterance expresses a given additional emotion class from among the plurality of disparate emotion classes. In response to determining that the spoken utterance expresses a given additional emotion class, from among the plurality of disparate emotion classes, the processor(s) of the client device may cause emoji(s) stored in association with the given additional emotion class to be visually rendered for presentation to the user. Notably, the determination of whether the additional spoken utterance expresses the given additional emotion class may be independent of the determination of whether the spoken utterance expresses the given emotion class. Put another way, the spoken utterance initially provided by the user may express a first emotion class, but the additional spoken utterance subsequently provided by the user may express a second, distinct emotion class and the emoji(s) that are visually rendered for presentation to the user at the display of the client device may be adapted accordingly. Moreover, and in implementations where the processor(s) of the client device determine that the given additional emotion class subsequently expressed by the additional spoken utterance is the same emotion class as the given emotion class initially expressed by the spoken utterance, the emoji(s) that are visually rendered for presentation to the user at the display of the client device based on any intervening usage of one or more of the emojis by the user.

In various implementations, the transcription that is visually rendered for presentation to the user and/or the emoji(s) that are visually rendered for presentation to the user may be provided as a service to a third-party software application (e.g., a third-party keyboard application, a third-party automated assistant application, and/or other third-party applications). In these implementations, the automated assistant may communicate with the third-party software application via an application programming interface (API) that enables the third-party software application and the automated assistant to communicate with one another via the API. For instance, the third-party software application may provide the audio data and/or the textual data that is predicted to correspond to the spoken utterance captured in the audio data via the API, and the processor(s) of the client device may generate the textual data based on processing the audio data and/or identify the emoji(s) that should be presented based on the spoken utterance. In these implementations, the processor(s) of the client device may then provide the textual data that is predicted to correspond to the spoken utterance and/or the emoji(s) back to the third-party software application via the API.

As used herein, the term dictation session can refer to any human-to-computer dialog session between the user and the automated assistant where the automated assistant is utilized to dictate textual data on behalf of the user, and for inclusion in a transcription that is associated with one or more software applications that are accessible at the client device (e.g., first-party software applications and/or third-party software applications). In some implementations, the spoken utterance may be received to initiate and complete the dictation session based on a single spoken utterance, whereas in other implementations, the spoken utterance may be received as part of an ongoing dictation session that is based on multiple spoken utterances. The one or more software applications can include any software application in which the user can dictate text, such as an email application, a text messaging application, a calendar application, a notes application, an automated assistant application (e.g., that can transmit the dictated text to other software applications), and/or any other software application in which the user can dictate text and that is accessible at the client device. The transcription may include at least a body, and optionally be associated with one or more fields that are based on a given software application associated with the transcription. For example, the transcription can be associated with a "to" field and a "subject" field when the transcription is an email associated with an email application, a "recipient" field when the transcription is a text message associated with a text messaging application, a "date" field and/or a "time" field when the transcription is a calendar entry associated with a calendar application, a "title" field when the transcription is a note associated with a notes application, and so on.

As used herein, the term "first-party" may refer to a software application or system that is developed and/or maintained by the same entity that develops and/or maintains the automated assistant described herein. Further, as used herein, the term "third-party" may refer to a software application or system that is developed and/or maintained by an entity that is different from the entity that develops and/or maintains the automated assistant described herein.

By using techniques described herein, one or more technical advantages may be achieved. As one non-limiting example, the techniques described herein enable the automated assistant to quickly and efficiently cause emojis that are contextually relevant to a transcription being dictated by the user to be visually rendered for presentation to the user. This enables the user to provide a single input, such as a single tap directed to one or more of the emojis or a single spoken utterance directed to one or more of the emojis (and processing of audio data that captures the single spoken utterance may be biased towards the one or more emojis), to cause one or more of the emojis to be incorporated into the transcription. As a result, a quantity of user inputs received at the client device may be reduced since the user need not manually interact with a keyboard of the client device to find one or more of these contextually relevant emojis and then provide additional input to cause one or more of the emojis to be incorporated into the transcription, thereby conserving computational resources at the client device. As another non-limiting example, the techniques described herein enable the automated assistant to cause emojis that are contextually relevant to a transcription being dictated by the user to be visually rendered for presentation to the user at a time that the user is most likely to provide the single input to cause one or more of the emojis to be incorporated into the transcription. For instance, by considering various confidence levels in different emotion classes, a duration of time that has lapsed with respect to the user providing the spoken utterance, various commands that may be provided by the user with respect to the transcription, and/or other factors, the automated assistant may cause one or more of the emojis to be visually rendered for presentation to the user at a time that the user is most likely to provide a user selection of one or more of the emojis and without distracting the user. As a result, the dictation session between the user and the automated assistant may be concluded in a more quick and efficient manner since a quantity of instances of the user losing their train of thought and having to re-initiate the dictation session and/or provide additional inputs is reduced.

The above description is provided as an overview of only some implementations of the present disclosure. Further description of those implementations, and other implementations, are described in more detail herein. As one non-limiting example, various implementations are described in more detail in the claims and detailed description included herein.

DETAILED DESCRIPTION

Figure 1:
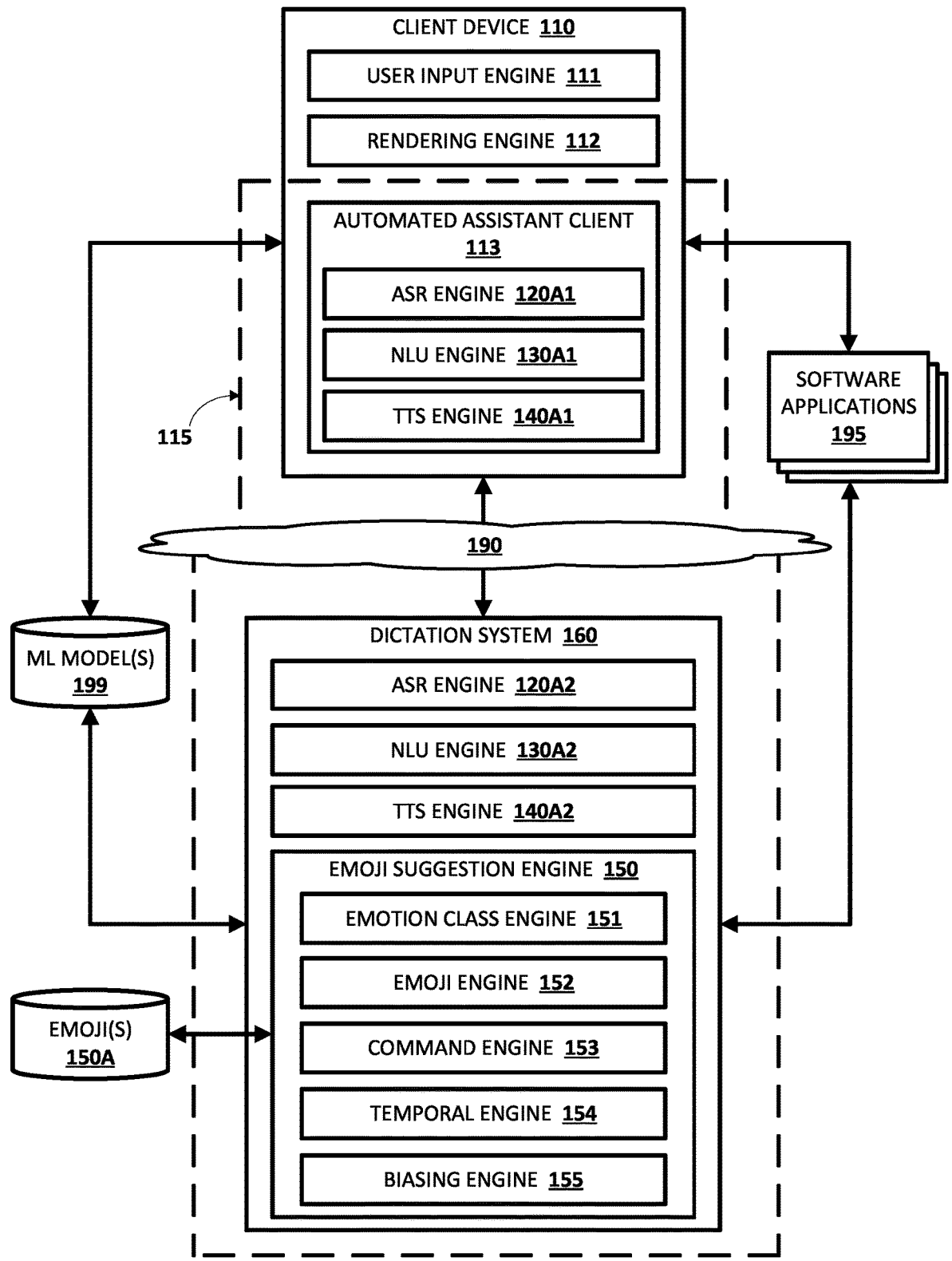
FIG. 1 is a block diagram of an example environment in which implementations disclosed herein may be implemented.

Turning to FIG. 1, a block diagram of an example environment that demonstrates various aspects of the present disclosure, and in which implementations disclosed herein can be implemented is depicted. The example environment includes a client device 110 and a dictation system 160. In some implementations, the dictation system 160 can be implemented locally at the client device 110. In additional or alternative implementations, one or more aspects of the dictation system 160 can be implemented remotely from the client device 110 as depicted in FIG. 1. In these implementations, the client device 110 and the dictation system 160 may be communicatively coupled with each other via one or more networks 190, such as one or more wired or wireless local area networks ("LANs," including Wi-Fi LANs, mesh networks, Bluetooth, near-field communication, etc.) or wide area networks ("WANs", including the Internet).

The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute an automated assistant client 113. An instance of the automated assistant client 113 can be an application that is separate from an operating system of the client device 110 (e.g., installed "on top" of the operating system)—or can alternatively be implemented directly by the operating system of the client device 110. The automated assistant client 113 can interact with the dictation system 160 via one or more of the networks 190. The automated assistant client 113 (and optionally by way of its interactions with the dictation system 160) may form what appears to be, from a user's perspective, a logical instance of an automated assistant 115 with which the user may engage in a human-to-computer dialog. An instance of the automated assistant 115 is depicted in FIG. 1, and is encompassed by a dashed line that includes the automated assistant client 113 of the client device 110 and the dictation system 160. It thus should be understood that a user that engages with the automated assistant client 113 executing on the client device 110 may, in effect, engage with his or her own logical instance of the automated assistant 115 (or a logical instance of the automated assistant 115 that is shared amongst a household or other group of users). For the sake of brevity and simplicity, the automated assistant 115 as used herein will refer to the automated assistant client 113 executing locally at the client device 110 and/or remotely from the client device 110 in a distributed manner.

In various implementations, the client device 110 may include a user input engine 111 that is configured to detect user input provided by a user of the client device 110 using one or more user interface input devices. For example, the client device 110 may be equipped with one or more microphones that detect acoustic (or pressure) waves, such as spoken utterances of the user or other sounds in an environment of the client device 110. Additionally, or alternatively, the client device 110 may be equipped with one or more vision components that are configured to capture and provide signal(s) indicative of movement (e.g., gestures) detected in a field of view of one or more of the vision components. Additionally, or alternatively, the client device 110 may be equipped with one or more touch sensitive components (e.g., a keyboard and mouse, a stylus, a touch screen, a touch panel, one or more software and/or hardware buttons, etc.) that are configured to capture and provide signal(s) indicative of various touch inputs and/or typed inputs directed to the client device 110.

In various implementations, the client device 110 may include a rendering engine 112 that is configured to provide content for audible and/or visual presentation to a user of the client device 110 using one or more user interface output devices. For example, the client device 110 may be equipped with one or more speakers that enable content to be provided for audible presentation to the user via the client device 110. Additionally, or alternatively, the client device 110 may be equipped with a display or projector that enables content to be provided for visual presentation to the user via the client device 110.

Further, the client device 110 and/or the dictation system 160 may include one or more memories for storage of data and software applications 195, one or more processors for accessing data and executing the software applications 195, and other components that facilitate communication over one or more of the networks 190. In some implementations, one or more of the software applications 195 can be installed locally at the client device 110, whereas in other implementations one or more of the software applications 195 can be hosted remotely (e.g., by one or more servers) and can be accessible by the client device 110 over one or more of the networks 190. The one or more of the software applications 195 may include first-party software applications and/or third-party software applications.

In some implementations, the operations performed by the automated assistant 115 may be implemented locally at the client device 110. As noted above, in various implementations, the client device 110 may operate the automated assistant client 113. As shown in FIG. 1, the automated assistant client 113 may include an automatic speech recognition (ASR) engine 120A1, a natural language understanding (NLU) engine 130A1, and a text-to-speech (TTS) engine 140A1. In these implementations, corresponding machine learning (ML) models and/or rules for these various engines may be on-device ML models that are stored in on-device storage of the client device 110 (e.g., ML model(s) database 199 is resident in the on-device storage of the client device 110). In some implementations, the operations performed by the automated assistant 115 may be distributed across multiple computer systems, such as when the dictation system 160 is implemented remotely from the client device 110 as depicted in FIG. 1. In these implementations, the automated assistant 115 may utilize ASR engine 120A2, NLU engine 130A2, and TTS engine 140A2 of the dictation system 160. Further, in these implementations, corresponding ML models and/or rules for these various engines may be remote ML models that are stored in remote storage (e.g., ML model(s) database 199 is resident in the remote storage). However, it should be understood that on-device processing may be prioritized to reduce latency and to preserve privacy.

Each of these engines may be configured to perform one or more functions. For example, the ASR engine(s) 120A1 and/or 120A2 can process, using ASR model(s) stored in machine learning (ML) model(s) database 199, audio data that captures spoken utterances and that is generated by microphone(s) of the client device 110 to generate ASR output. Further, the NLU engine(s) 130A1 and/or 130A2 can process, using NLU model(s) stored in the ML model(s) database 199, the ASR output to generate NLU output. Moreover, the TTS engine(s) 140A1 and/or 140A2 can process, using TTS model(s) stored in the ML model(s) database 199, textual data (e.g., text formulated by the automated assistant 115) to generate synthesized speech audio data that includes computer-generated synthesized speech.

In various implementations, the ASR output can include, for example, one or more speech hypotheses that are predicted to correspond to the spoken utterance of the user that is captured in the audio data, one or more corresponding predicted values (e.g., probabilities, log likelihoods, and/or other values) for each of the one or more speech hypotheses, a plurality of phonemes that are predicted to correspond to the spoken utterance of the user that is captured in the audio data, and/or other ASR output. In some versions of those implementations, the ASR engine(s) 120A1 and/or 120A2 can select one or more of the speech hypotheses as textual data that is predicted to correspond to the spoken utterance (e.g., based on the corresponding predicted values).

In various implementations, the NLU output can include, for example, annotated textual data that includes one or more annotations of the textual data for one or more (e.g., all) of the terms determined based on the ASR output. For example, the NLU engine(s) 130A1 and/or 130A2 may include a part of speech tagger (not depicted) configured to annotate terms with their grammatical roles. Additionally, or alternatively, the NLU engine(s) 130A1 and/or 130A2 may include an entity tagger (not depicted) configured to annotate entity references in one or more segments of the textual data, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

Additionally, or alternatively, the NLU engine(s) 130A1 and/or 130A2 may include a coreference resolver (not depicted) configured to group, or "cluster," references to the same entity based on one or more contextual cues. For example, the coreference resolver may be utilized to resolve the term "them" to "buy theatre tickets" in the natural language input "buy them", based on "theatre tickets" being mentioned in a client device notification rendered immediately prior to receiving input "buy them". In some implementations, one or more components of the NLU engine(s) 130A1 and/or 130A2 may rely on annotations from one or more other components of the NLU engine(s) 130A1 and/or 130A2. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

As described herein, the automated assistant 115 may cause various emoji(s) and/or command(s) to be visually rendered for presentation to the user of the client device 110 based on various emotions expressed by a spoken utterance and/or based on term(s) included in the spoken utterance. In determining whether to cause various emoji(s) and/or command(s) to be visually rendered for presentation to the user of the client device 110 based on various emotions expressed by the spoken utterance and/or based on term(s) included in the spoken utterance, the automated assistant 115 may utilize an emoji suggestion engine 150 of the dictation system 160. In various implementations, the emoji suggestion engine 150 may include an emotion class engine 151, an emoji engine 152, a command engine 153, a temporal engine 154, and a biasing engine 155 as depicted in FIG. 1. Although the emoji suggestion engine 150 is depicted in FIG. 1 as including particular engines, it should be understood that is for the sake of example and is not meant to be limiting and that various engines may be added, combined, and/or omitted.

For the sake of example to illustrate various aspects of the emoji suggestion engine, assume that the user of the client device 110 is engaged in a dictation session with the automated assistant 115, and assume that the user has provided a spoken utterance during the dictation session. Further assume that the automated assistant 115 has caused the ASR engine(s) 120A1 and/or 120A2 to process, using the ASR model(s), audio data that captures the spoken utterance to generate textual data that is predicted to correspond to the spoken utterance. Further assume that the automated assistant 115 has caused the rendering engine 112 to visually render a transcription corresponding to the spoken utterance for presentation to the user via the display of the computing device 110.

In various implementations, the emotion class engine 151 may determine whether the spoken utterance expresses, from among a plurality of disparate emotion classes, no emotion class, a given emotion class, or multiple disparate emotion classes. The plurality of disparate emotion classes that may be expressed may the spoken utterance may include, for example, various discrete emotions that convey a mood of the user that is embodied in the spoken utterance, including, but not limited to, a "happy" emotion class, a "sad" emotion class, an "excited" emotion class, an "angry" emotion class, a "surprised" emotion class, a "scared" emotion class, and/or other emotion classes. Notably, each of these emotion classes may be stored in association with one or more emojis (e.g., in emoji(s) database 150A) that represent these various emotions. These emoji(s) may include faces, animals, persons, objects, places, and/or any other visual content that may be utilized to represent these various emotion. Further, one or more terms that may be included in the spoken utterance may be stored in association with one or more emojis (e.g., in the emoji(s) database 150A) that represent the one or more terms even if the one or more terms are not associated with any emotion class. For instance, the term "beach" may not be stored in association with any particular emotion class, but may be stored in association with a "beach" emoji that depicts a beach, a "sun" emoji that depicts the sun, a "palm tree" emoji that depicts a palm tree, or the like. Accordingly, it should be understood that different emotion classes may be stored in association with different emojis and that these emojis are not mutually exclusive to a given class. Similarly, it should be understood that different terms may be stored in association with different emojis and that these emojis are not mutually exclusive to a given term.

In some versions of these implementations, and in making this determination, the emotion class engine 151 may process, using an emotion classifier, at least the textual data that is predicted to correspond to the spoken utterance to generate emotion classifier output. The textual data that is predicted to correspond to the spoken utterance may be represented as a sequence of tokens, word2vec representation, or other representation that is provided as input across the emotion classifier to generate the emotion classifier output. In additional or alternative versions of these implementations, and in making this determination, the emotion class engine 151 may process, using the emotion classifier, the audio data (or features thereof, such as prosodic properties thereof, melbank features thereof, etc.) that captures the spoken utterance to better inform the emotion classifier of emotion classes that may be expressed by the spoken utterance. Notably, the emotion classifier output may vary based on how the emotion classifier is trained.

For example, the emotion classifier may be trained to generate a confidence value distribution over the plurality of disparate emotion classes as the emotion classifier output, and the emotion class engine 151 may determine, based on the confidence value distribution, whether the spoken utterance expresses no emotion class, a given emotion class, or multiple disparate emotion classes. For instance, if none of the confidence values in the distribution satisfy a threshold confidence value, then the emotion class engine 151 may determine that the spoken utterance expresses no emotion class (e.g., as described with respect to FIG. 4A). Also, for instance, if the confidence value for the given emotion class (i.e., but no other emotion class) in the distribution satisfies the threshold confidence value, then the emotion class engine 151 may determine that the spoken utterance expresses the given emotion class (e.g., as described with respect to FIGS. 4B and 4D). Also, for instance, if the confidence value for multiple emotion classes in the distribution satisfy the threshold confidence value or that the confidence value for multiple emotion classes in the distribution fail to satisfy a threshold confidence value but satisfy a second threshold confidence value, then the emotion class engine 151 may determine that the spoken utterance expresses multiple emotion classes (e.g., as described with respect to FIG. 5A). Notably, in each of these instances, the emoji(s) and/or the command(s) that are visually rendered for presentation to the user may differ (e.g., as described with respect to FIGS. 4A, 4B, 4D, and 5A).

As another example, the emotion classifier may be trained to generate an embedding that corresponds to a lower-level representation of the spoken utterance as the emotion classifier output, and the emotion class engine 151 may determine, based on the embedding, whether the spoken utterance expresses no emotion class, a given emotion class, or multiple disparate emotion classes. For instance, the embedding may be mapped to an embedding space, or other lower dimensional space, that enables the embedding to be compared to a plurality of previously generated embedding. In these instances, the previously generated embeddings may each correspond to an emotion class, such that each of the plurality of disparate emotion classes are associated with a dedicated portion of the embedding space (e.g., a "happy" portion of the embedding space, a "sad" portion of the embedding space, a "no emotion" portion, and so on for each of the other emotion classes). Accordingly, if the embedding is within a threshold distance (e.g., determined based on Euclidean distance, cosine similarity, or other distance measures in the embedding space) of previously generated embeddings corresponding to the "no emotion" portion of the embedding space or beyond a threshold distance from all of the other portions of the embedding space, then the emotion class engine 151 may determine that the spoken utterance expresses no emotion class (e.g., as described with respect to FIG. 4A). Further, if the embedding is within a threshold distance of previously generated embeddings for the given emotion class, then the emotion class engine 151 may determine that the spoken utterance expresses the given emotion class (e.g., as described with respect to FIGS. 4B and 4D). Moreover, if the embedding is within a threshold distance of previously generated embeddings for multiple given emotion class, then the emotion class engine 151 may determine that the spoken utterance expresses multiple emotion classes (e.g., as described with respect to FIG. 5A). Again, in each of these instances, the emoji(s) and/or the command(s) that are visually rendered for presentation to the user may differ (e.g., as described with respect to FIGS. 4A, 4B, 4D, and 5A).

In various implementations, the emoji engine 152 may identify one or more emojis to be visually rendered for presentation to the user via the display of the client device 110. For example, in implementations where the emotion class engine 151 determines that the spoken utterance expresses a given emotion class, the emoji engine 152 may identify the one or more emojis that are stored in association with the given emoji class (e.g., in the emoji(s) database 150A), and provide the one or more emojis to the rendering engine 112 to cause the one or more emojis to be visually rendered for presentation to the user via the display of the client device. As another example, in implementations where the emotion class engine 151 determines that the spoken utterance expresses no or emotion class or multiple emotion class, the emoji engine 152 may identify the one or more emojis that are stored in association with one or more terms of the spoken utterance (e.g., in the emoji(s) database 150A), and provide the one or more emojis to the rendering engine 112 to cause the one or more emojis to be visually rendered for presentation to the user via the display of the client device. In implementations where the emotion class engine 151 determines that the spoken utterance expresses a given emotion class or multiple emotion classes, but there are no emojis stored in association with the given emotion class or there are no emojis stored in association with one or more of the terms of the spoken utterance, then the emoji engine 152 may provide an indication that no emojis are available to the command engine 153. Notably, each of the one or more emojis that are provided for presentation to the user may be selectable (e.g., via a touch selection or voice selection) to enable the user of the client device 110 to quickly and efficiently cause one or more of the emojis to be incorporated into the transcription.

In various implementations, the command engine 153 may identify one or more commands to be visually rendered for presentation to the user via the display of the client device 110. The one or more commands may include, for example, a "send" command that causes the transcription to be transmitted to an additional client device over one or more networks, an "edit" command that causes the automated assistant 115 to initiate an editing mode for the transcription, a "cancel" or "delete" command that causes the transcription to be cancelled or deleted, and/or other commands. Notably, each of the one or more commands that are provided for presentation to the user may be selectable (e.g., via a touch selection or voice selection) to enable the user of the client device 110 to quickly and efficiently cause the automated assistant 115 to perform corresponding operations with the transcription. For example, in implementations where the emotion class engine 151 determines that the spoken utterance expresses no emotion class, the command engine 152 may identify the one or more commands that are associated with the transcription, and provide the one or more commands to the rendering engine 112 to cause the one or more commands to be visually rendered for presentation to the user via the display of the client device.

In various implementations, the temporal engine 154 may instruct the emoji engine 152 and/or the command engine 153 when to provide the one or more emojis and/or the one or more commands, respectively, to the rendering engine 112. For example, in implementations where the emoji engine 152 identifies the one or more emojis to be visually rendered for presentation to the user (e.g., emoji(s) that are associated with the given emotion class and/or emoji(s) that are associated with term(s) included in the spoken utterance), the temporal engine 154 may instruct the emoji engine 152 to refrain from causing the one or more emojis to be provided to the rendering engine 112 until a threshold duration of time lapses with respect to the user providing the spoken utterance (e.g., 0.25 seconds after a last word included in the spoken utterance, 0.5 seconds after the last word included in the spoken utterance, 1.0 second after the last word included in the spoken utterance, etc.) to refrain from distracting the user by providing the one or more emojis in a streaming manner. In this example, in implementations where the emoji engine 152 has provided the one or more emojis to be provided to the rendering engine 112,), the temporal engine 154 may instruct the command engine 153 to cause the one or more commands to be provided to the rendering engine 112 based on no user selection of any of the one or more emojis within a threshold duration of time since the one or more emojis were visually rendered for presentation to the user (e.g., 5.0 seconds after the one or more emojis were visually rendered for presentation to the user, 10.0 seconds after the one or more emojis were visually rendered for presentation to the user, etc.). Notably, in this example, the user has been provided the opportunity to select one or more of the emojis, but has failed to do so, and, as a result, the temporal engine 154 may instruct the command engine 153 to cause the one or more commands to be provided to the rendering engine 112 to further facilitate the user in completing the dictation session in more quick and efficient manner. As another example, in implementations where the command engine 153 identifies the one or more commands to be visually rendered for presentation to the user (e.g., when no emotion class is expressed by the spoken utterance), the temporal engine 154 may instruct the command engine 153 to refrain from causing the one or more commands to be provided to the rendering engine 112 until a threshold duration of time lapses with respect to the user providing the spoken utterance (e.g., 0.25 seconds after a last word included in the spoken utterance, 0.5 seconds after the last word included in the spoken utterance, 1.0 second after the last word included in the spoken utterance, etc.) to refrain from distracting the user by providing the one or more commands in a streaming manner.

In various implementations, the biasing engine 155 may cause processing of any additional spoken utterances that are received while the one or more emojis (e.g., emoji(s) that are associated with the given emotion class and/or emoji(s) that are associated with term(s) included in the spoken utterance) and/or while the one or more commands (e.g., when no emotion class is expressed by the spoken utterance or when the emoji(s) have been supplanted) that are being visually rendered for presentation to the user via the display of the client device 110 to be biased towards references of the emoji(s) and/or the command(s). For instance, assume that the emotion class engine 151 determined that a spoken utterance including the term "beach" expresses multiple emotion classes. As a result, the emoji engine 152 may identify one or more emojis that are stored in association with the term "beach", including at least a "sun" emoji that depicts the sun, and cause the one or more emojis to be provided to the rendering engine 112. In this instance, if the user subsequently provides an additional spoken utterance of "add the sun emoji" to cause the "sun" emoji to be incorporated into the transcription that includes the textual data that is predicted to correspond to the spoken utterance. In this example, the "sun" emoji may be associated with an emoji reference (e.g., a reference to "sun" that identified the emoji). Accordingly, the biasing engine 155 may cause processing of additional audio data that captures the additional spoken utterance to biased towards "sun" since the "sun" emoji is being visually rendered at the display of the client device 110. Otherwise, a "son" emoji (e.g., that identifies a male child) may possibly incorporated into the transcription in lieu of the "sun" emoji as the user intended.

Although particular operations are described with respect to the various engines of the emoji suggestion engine 150, it should be understood that is to illustrate various techniques described herein and is not meant to be limiting. Further, additional functionalities the various engines of the emoji suggestion engine 150 are described in more detail herein (e.g., with respect to FIGS. 2, 3, 4A-4E, and 5A-5B).

Figure 2:
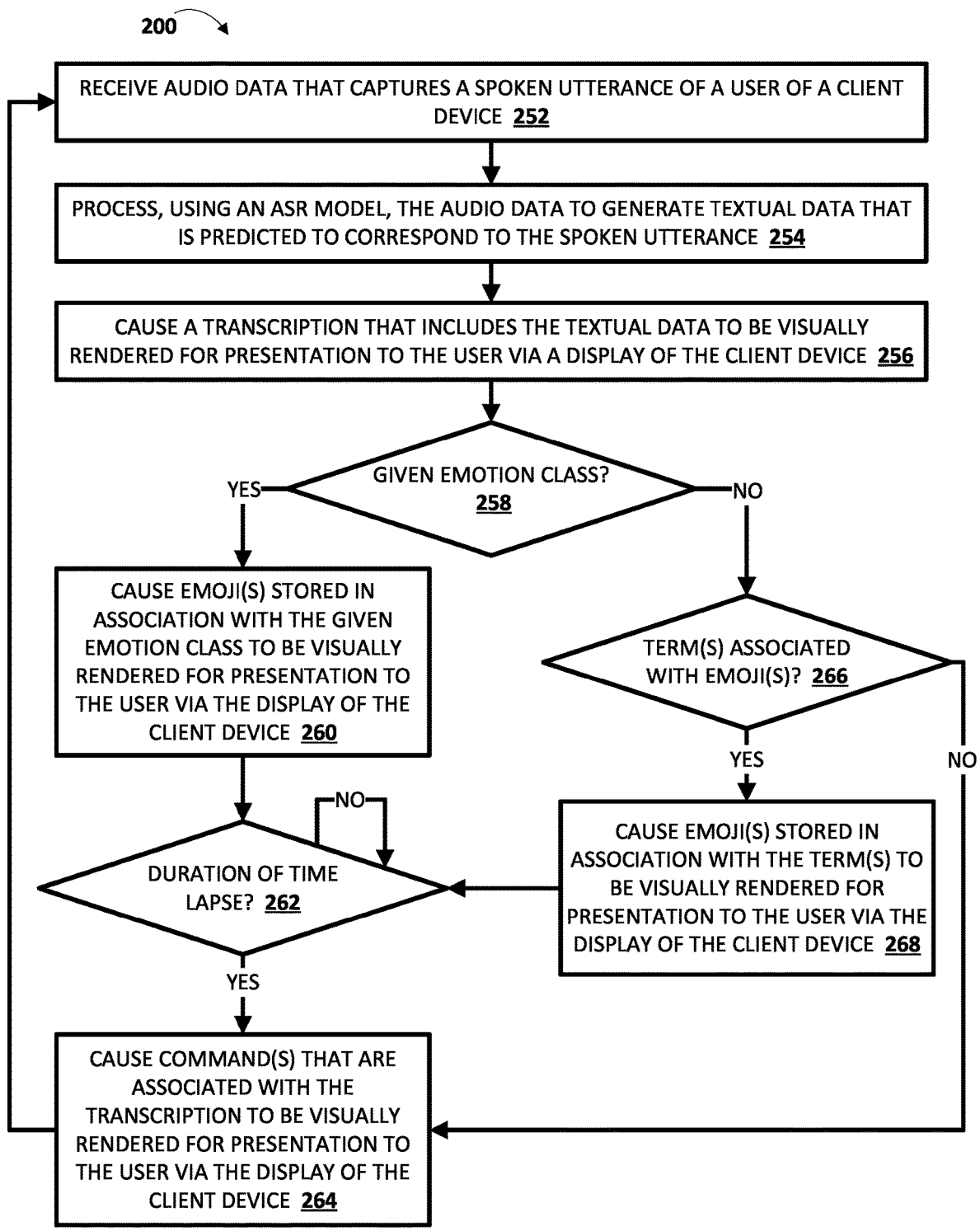
FIG. 2 is a flowchart illustrating an example method of causing emoji(s) that are stored in association with a given emotion class expressed by a spoken utterance to be visually rendered for presentation to a user, in accordance with various implementations.

Turning now to FIG. 2, a flowchart illustrating an example method 200 of causing emoji(s) that are stored in association with a given emotion class expressed by a spoken utterance to be visually rendered for presentation to a user is depicted. For convenience, the operations of the method 200 are described with reference to a system that performs the operations. This system of the method 200 includes one or more processors, memory, and/or other component(s) of computing device(s) (e.g., the client device 110 of FIGS. 1, 4A-4E, 5A-5B, the dictation system 160 of FIG. 1, computing device 610 of FIG. 6, one or more servers, and/or other computing devices). Moreover, while operations of the method 200 are shown in a particular order, this is not meant to be limiting. One or more operations may be reordered, omitted, and/or added.

At block 252, the system receives audio data that captures a spoken utterance of a user of a client device. The audio data that captures the spoken utterance of the user may be generated by one or more microphones of the client device, and optionally in response to an automated assistant being invoked. At block 254, the system processes, using an automatic speech recognition (ASR) model, the audio data to generate textual data that is predicted to correspond to the spoken utterance. At block 256, the system causes a transcription that includes the textual data to be visually rendered for presentation to the user via a display of the client device. These operations are described in more detail herein (e.g., with respect to the automated assistant client 115 of FIG. 1, and the examples of FIGS. 4A-4E and 5A-5B).

At block 258, the system determines whether the spoken utterance expresses a given emotion class from among a plurality of disparate emotion classes. The system may determine whether the spoken utterance expresses a given emotion class based on processing the textual data that is predicted to correspond to the spoken utterance and/or based on processing the audio data captures the spoken utterance (e.g., as described with respect to the emotion class engine 151 of FIG. 1). If, at an iteration of block 258, the system determines that the spoken utterance expresses a given emotion class from among the plurality of disparate emotion classes, the system may proceed to block 260.

At block 260, the system causes one or more emojis stored in association with the given emotion class to be visually rendered for presentation to the user via the display of the client device. The one or more emojis stored in association with the given emotion class and causing the one or more emojis stored in association with the given emotion class to be visually rendered for presentation to the user is described in more detail herein (e.g., with respect to the emotion class engine 151 of FIG. 1, the emoji engine 152 of FIG. 1, and the examples of FIGS. 4B and 4D).

At block 262, the system determines whether a duration of time has lapsed since causing the one or more emojis stored in association with the given emotion class to be visually rendered for presentation to the user via the display of the client device and/or since receiving a user selecting of one or more of the emojis (e.g., as described with respect to the temporal engine 154 of FIG. 1, and the examples of FIGS. 4B-4E and 5A-5B). If, at an iteration of block 262, the system determines that the duration of time has not lapsed, then the system may continue monitoring for the duration of time to lapse at block 262. If, at an iteration of block 262, the system determines that the duration of time has lapsed, then the system may proceed to block 264.

At block 264, the system may cause one or more commands that are associated with the transcription to be visually rendered for presentation to the user via the display of the client device. The one or more commands that are associated with the transcription and causing the one or more commands that are associated with the transcription to be visually rendered for presentation to the user is described in more detail herein (e.g., with respect to the command engine 153 of FIG. 1, and the examples of FIGS. 4C, 4E, and 5B).

The system may return to block 252 to receive additional audio data that captures an additional spoken utterance of the user of the client device, and may perform an additional iteration of the method 200 with respect to the additional spoken utterance. Notably, in determining whether the additional spoken utterance expresses a given additional emotion class at an additional iteration of the method 200, the system may make this determination independent of any determination of whether the spoken utterance expresses a given emotion class at the prior iteration of the method 200.

If, at an iteration of block 258, the system determines that the spoken utterance does not express any emotion class and/or that the spoken utterance expresses multiple emotion classes from among the plurality of disparate emotion classes, the system may proceed to block 266. At block 266, the system determines whether one or more terms included in the spoken utterance are associated with one or more emojis (e.g., with respect to the emotion class engine 151 of FIG. 1, the emoji engine 152 of FIG. 1, and the example of FIGS. 5A). If, at an iteration of block 266, the system determines that one or more terms included in the spoken utterance are associated with one or more emojis, then the system may proceed to block 268. At block 268, the system causes the one or more emojis that are stored in association with one or more of the terms to be visually rendered for presentation to the user via the display of the client device (e.g., with respect to the emotion class engine 151 of FIG. 1, the emoji engine 152 of FIG. 1, and the example of FIGS. 5A).

At block 262, the system determines whether a duration of time has lapsed since causing the one or more emojis stored in association with the given emotion class to be visually rendered for presentation to the user via the display of the client device and/or since receiving a user selecting of one or more of the emojis. If, at an iteration of block 262, the system determines that the duration of time has not lapsed, then the system may continue monitoring for the duration of time to lapse at block 262. If, at an iteration of block 262, the system determines that the duration of time has lapsed, then the system may proceed to block 264. At block 264, the system may cause one or more commands that are association with the transcription to be visually rendered for presentation to the user via the display of the client device. Notably, the operations of blocks 262 and 264 may be performed in the same or similar manner when the system arrives at block 262 from block 268 as described above with respect to the system arriving at block 262 from block 260.

The system may return to block 252 to receive additional audio data that captures an additional spoken utterance of the user of the client device, and may perform an additional iteration of the method 200 with respect to the additional spoken utterance. Again, in determining whether the additional spoken utterance expresses a given additional emotion class at an additional iteration of the method 200, the system may make this determination independent of any determination of whether the spoken utterance expresses a given emotion class at the prior iteration of the method 200.

If, at an iteration of block 266, the system determines that no terms included in the spoken utterance are associated with one or more emojis, then the system may proceed to block 264. At block 264, the system may cause one or more commands that are association with the transcription to be visually rendered for presentation to the user via the display of the client device. Notably, the operations of block 264 may be performed in the same or similar manner when the system arrives at block 264 from block 266 as described above with respect to the system arriving at block 264 from block 262.

The system may return to block 252 to receive additional audio data that captures an additional spoken utterance of the user of the client device, and may perform an additional iteration of the method 200 with respect to the additional spoken utterance. Again, in determining whether the additional spoken utterance expresses a given additional emotion class at an additional iteration of the method 200, the system may make this determination independent of any determination of whether the spoken utterance expresses a given emotion class at the prior iteration of the method 200.

Figure 3:
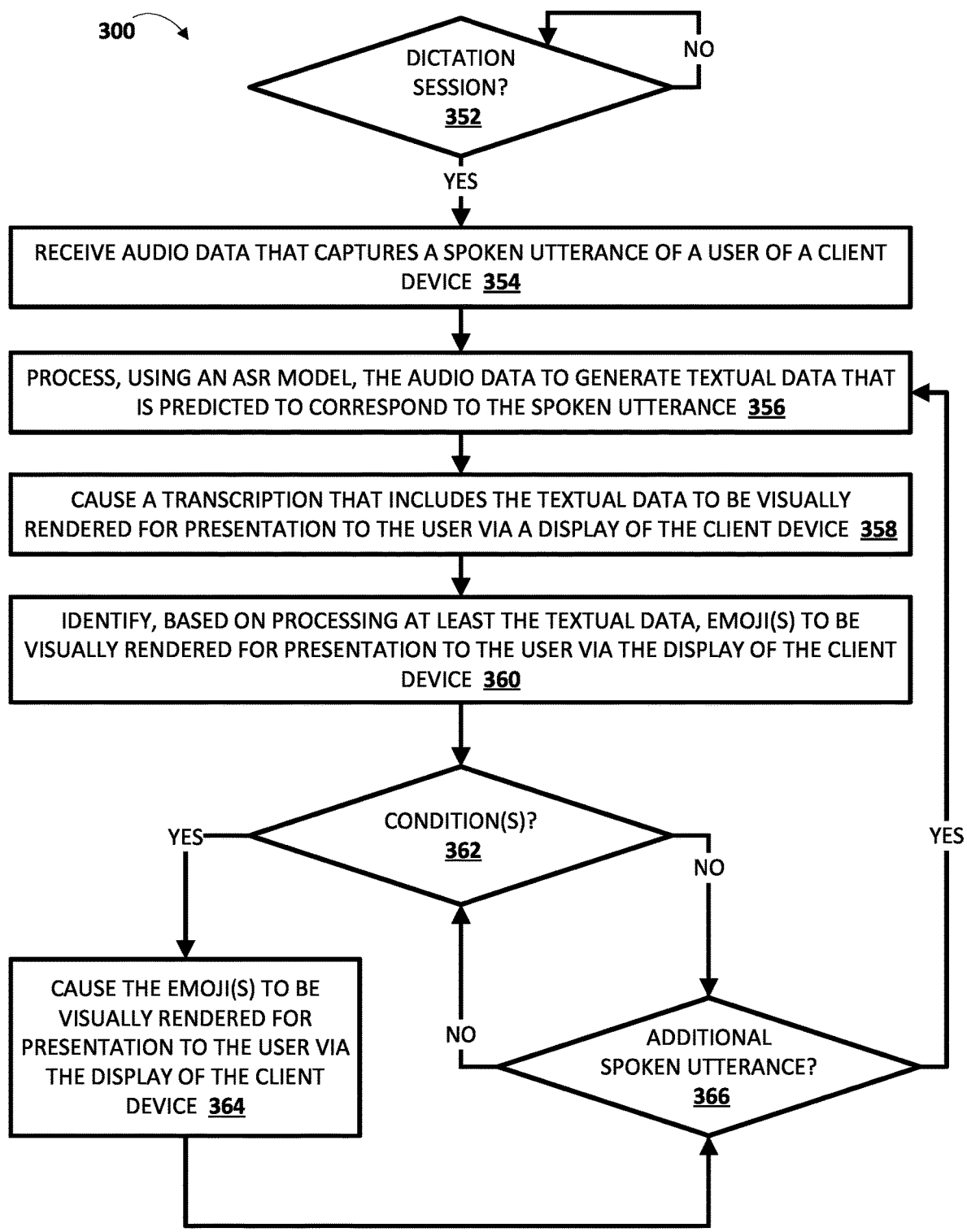
FIG. 3 is a flowchart illustrating another example method of causing emoji(s) that are stored in association with a given emotion class expressed by a spoken utterance to be visually rendered for presentation to a user, in accordance with various implementations.

Turning now to FIG. 3, a flowchart illustrating another example method 300 of causing emoji(s) that are stored in association with a given emotion class expressed by a spoken utterance to be visually rendered for presentation to a user is depicted. For convenience, the operations of the method 300 are described with reference to a system that performs the operations. This system of the method 300 includes one or more processors, memory, and/or other component(s) of computing device(s) (e.g., the client device 110 of FIGS. 1, 4A-4E, 5A-5B, the dictation system 160 of FIG. 1, computing device 610 of FIG. 6, one or more servers, and/or other computing devices). Moreover, while operations of the method 300 are shown in a particular order, this is not meant to be limiting. One or more operations may be reordered, omitted, and/or added.

At block 352, the system determines whether a user of a client device is engaged in a dictation session with an automated assistant executing at least in part at the client device. In some implementations, the user of the client device may explicitly engage in the dictation session with the automated assistant based on explicit input to initiate the dictation session, whereas in other implementations, the user of the client device may implicitly engage in the dictation session with the automated assistant by beginning to speak to the automated assistant. If, at an iteration of block 352, the system determines that the user is not engaged in a dictation session with the automated assistant, the system may continue monitoring for whether the user is engaged in the dictation session with the automated assistant at block 352. If, at an iteration of block 352, the system determines that the user is engaged in a dictation session with the automated assistant, the system may proceed to block 354.

At block 354, the system receives audio data that captures a spoken utterance of a user of a client device. The audio data that captures the spoken utterance of the user may be generated by one or more microphones of the client device, and optionally in response to an automated assistant being invoked. At block 356, the system processes, using an automatic speech recognition (ASR) model, the audio data to generate textual data is predicted to correspond to the spoken utterance. At block 358, the system causes a transcription that includes the textual data to be visually rendered for presentation to the user via a display of the client device. These operations are described in more detail herein (e.g., with respect to the automated assistant client 115 of FIG. 1, and the examples of FIGS. 4A-4E and 5A-5B).

At block 360, the system identifies, based on processing at least the textual data, one or more emojis to be visually rendered for presentation to the user via the display of the client device. In some implementations, the one or more emojis to be visually rendered may be stored in association with a given emotion class expressed by the spoken utterance. In additional or alternative implementations, the one or more emojis to be visually rendered may be stored in association with one or more terms included in the spoken utterance.

At block 362, the system determines whether one or more conditions for causing the one or more emojis to be visually rendered for presentation to the user are satisfied. The one or more conditions may include, for example, whether confidence values associated one or more emotion classes that are predicted to correspond to the spoken utterance satisfy one or more confidence value thresholds, whether a duration of time has lapsed with respect to the user providing the spoken utterance, whether the user has historically incorporated emojis into transcriptions, and/or other conditions. If, at iteration of block 362, the system determines that the one or more conditions are satisfied, the system may proceed to block 364. At block 364, the system causes the one or more emojis to be visually rendered for presentation to the user via the display of the client device (e.g., as described with respect to, for instance, the examples of FIGS. 4A-4E and 5A-5B). The system may proceed to block 366. Block 366 is described in more detail below.

If, at iteration of block 362, the system determines that the one or more conditions are not satisfied, the system may proceed to block 366. At block 366, the system determines whether an additional spoken utterance of the user is received. If, at an iteration of block 366, the system determines that no additional spoken utterance is received, then the system may return to block 362 to determine whether one or more conditions for causing the one or more emojis to be visually rendered for presentation to the user are satisfied. Put another way, the system may continue monitoring for satisfaction of the one or more conditions while also monitoring for one or more additional spoken utterances from the user.

In implementations where the system proceeded to block 366 from block 362, the one or more conditions have not been satisfied. As a result, the system may again determine whether one or more conditions for causing the one or more emojis to be visually rendered for presentation to the user are satisfied. Further, in implementations where the system proceeded to block 366 from block 364, the one or more conditions have already been satisfied. As a result, the one or more emojis that have already been visually rendered for presentation to the user may persist at the display of the client device. However, in various implementations, and in response to no user selection of any of the one or more emojis being received from the user, the one or more emojis may be supplanted with one or more commands (e.g., as described with respect to block 262 and 264 of the method 200 of FIG. 2). This enables the system to cause the one or more emojis to be visually rendered for presentation to the user at a time that the one or more emojis are contextually relevant to the spoke utterance without distracting the user in providing the spoken utterance or one or more additional spoken utterances.

If, at an iteration of block 366, the system determines that additional spoken utterance is received, then the system may return to block 356, and may perform an additional iteration of the method 300 with respect to additional audio data that captures the additional spoken utterance. Notably, in identifying one or more additional emojis at an additional iteration of the method 300, the system may make this identification independent of any emojis identified at the prior iteration of the method 300.

Turning now to FIGS. 4A-4E and 5A-5B, various non-limiting examples of causing emoji(s) and/or command(s) to be visually rendered for presentation to a user are depicted. An automated assistant (e.g., an instance of the automated assistant 115 from FIG. 1) can be implemented at least in part at the client device 110 (e.g., an instance of the client device 110 from FIG. 1). The automated assistant can utilize a dictation system (e.g., the dictation system 160 described with respect to FIG. 1) to cause various emoji(s) and/or command(s) to be visually rendered for presentation to the user of the client device 110 based on various emotions expressed by a spoken utterance.

The client device 110 depicted in FIGS. 4A-4E and 5A-5B may include various user interface components including, for example, microphone(s) to generate audio data based on spoken utterances and/or other audible input, speaker(s) to audibly render synthesized speech and/or other audible output, and a display 180 to receive touch input and/or to visually render transcriptions, emojis, commands, and/or other visual output. Further, the display 180 of the client device 110 includes various system interface elements 181, 182, and 183 (e.g., hardware and/or software interface elements) that may be interacted with by the user of the client device 110 to cause the client device 110 to perform one or more actions. The display 180 of the client device 110 enables the user to interact with content rendered on the display 180 by touch input (e.g., by directing user input to the display 180 or portions thereof (e.g., to text entry box 184, to keyboard 186, or to other portions of the display 180) and/or by spoken input (e.g., by selecting microphone interface element 185—or just by speaking without necessarily selecting the microphone interface element 185 (i.e., the automated assistant may monitor for one or more terms or phrases, gesture(s) gaze(s), mouth movement(s), lip movement(s), and/or other conditions to activate spoken input) at the client device 110).

For the sake of example throughout FIGS. 4A-4E and 5A-5B, assume that the user of the client device 110 has received a text message as an incoming electronic communication from an additional user (e.g., "Jane") via a text messaging application 195A that is accessible at the client device 110 (e.g., one of the software applications 195 described with respect to FIG. 1). Further assume that the text message includes textual data 452 of "What do you want to do tonight?", and that the user of the client device 110 has initiated a dictation session with the automated assistant to generate a text message as a reply electronic communication (e.g., via actuation of the microphone interface element 185 and/or by other means). Although FIGS. 4A-4E and 5A-5B are described with respect to the user interaction being performed via the text messaging application 195A, it should be understood that is for the sake of example to illustrate various techniques described herein and is not meant to be limiting. For example, the user interaction may be performed using a dedicated automated assistant application or any other application in which a dictation session may be initiated (e.g., an email application, a calendar application, a reminders application, and/or other first-party and/or third-party software applications).

Figure 4A:
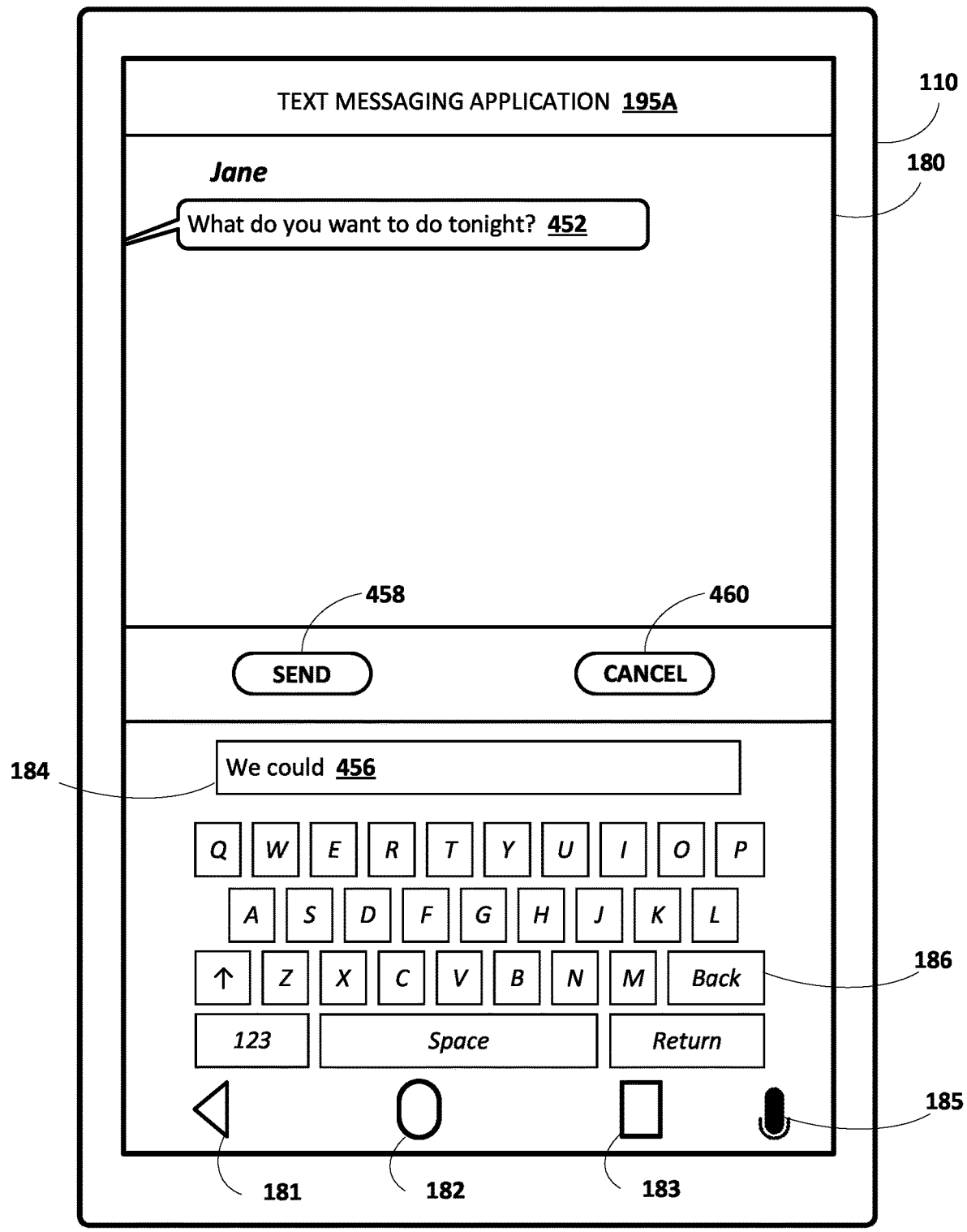
FIG. 4A, FIG. 4B, FIG. 4C, FIG. 4D, and FIG. 4E illustrate various non-limiting examples of causing emoji(s) that are stored in association with a given emotion class expressed by a spoken utterance and/or command(s) to be visually rendered for presentation to a user, in accordance with various implementations.

Referring specifically to FIG. 4A, assume that the user of the client device 110, in dictating the text message as the reply electronic communication, provides a spoken utterance 454A of "We could . . . " and pauses as indicated by the " . . . " included in the spoken utterance 454A. In the example of FIG. 4A, the automated assistant may process, using an ASR model, audio data that captures the spoken utterance 454A to generate textual data that is predicted to correspond to the spoken utterance 454A (e.g., textual data of "We could"), and may cause a transcription 456 that includes the textual data to be visually rendered for presentation to the user of the client device 110. Although the transcription 456 is depicted throughout FIGS. 4A-4E and 5A-5B as being included in the text entry box 184, it should be understood that is for the sake of example and is not meant to be limiting.

Further, in the example of FIG. 4A, the automated assistant may determine whether the spoken utterance 454A expresses a given emotion class, from among a plurality of disparate emotion classes, and based on the textual data that is predicted to correspond to the spoken utterance 454A and/or the audio data that captures the spoken utterance 454A (e.g., as described with respect to the emotion class engine 151 of FIG. 1). However, for the sake of example in FIG. 4A, assume that the automated assistant determines that the spoken utterance 454A does not express any emotion class (e.g., "We could" does not express any emotion class as determined using an emotion classifier described with respect to the emotion class engine 151 of FIG. 1). Moreover, in the example of FIG. 4A and optionally in response to determining that the spoken utterance 454A does not express any emotion class, the automated assistant may determine whether the spoken utterance 454A includes one or more term(s) that are stored in association with one or more emojis (e.g., as described with respect to the emoji engine 152 of FIG. 1). However, for the sake of example in FIG. 4A, assume that the automated assistant determines that the spoken utterance 454A does not include any terms that are stored in association with any emojis (e.g., neither of the terms of "We" and "could" are stored in association with any emojis in the emoji(s) database 150A of FIG. 1).

Nonetheless, in the example of FIG. 4A, the automated assistant may still cause one or more commands to be visually rendered for presentation to the user via the display 180 of the client device 110 to help conclude the dictation session in a quick and efficient manner. For example, and as shown in FIG. 4A, the automated assistant may cause a "send" selectable element 458 and a "cancel" selectable element 460 to be visually rendered for presentation to the user via the display 180 of the client device 110 as the one or more commands (e.g., as described with respect to the command engine 153 of FIG. 1). Accordingly, and in response to receiving a user selection of the "send" selectable element 458 (e.g., touch input directed to the "send" selectable element 458 or an additional spoken utterance of "send"), the transcription 456 may be transmitted to the additional client device (e.g., Jane's client device) as the reply electronic communication. Further, and in response to receiving a user selection of the "cancel" selectable element 460 (e.g., touch input directed to the "cancel" selectable element 458 or an additional spoken utterance of "cancel"), the transcription 456 may be cancelled or deleted.

Notably, in the example of FIG. 4A, the one or more commands may only be visually rendered for presentation to the user via the display 180 of the client device 110 in response to determining that the user of the client device 110 has paused for a threshold duration of time has lapsed with respect to saying "could" (e.g., as indicated by the " . . . " included in the spoken utterance 454A and as described with respect to the temporal engine 154 of FIG. 1). Put another way, in various implementations, the one or more commands may only be visually rendered for presentation to the user via the display 180 of the client device 110 when the automated assistant determines that the user may be done dictating the reply electronic communication. In these and other manners, the automated assistant may balance concluding the dictation session in a quick and efficient manner while refraining from distracting the user since the pause may indicate that the user is collecting their thoughts to continue providing additional spoken utterances. However, it should be understood that the one or more commands may be visually rendered for presentation to the user via the display 180 of the client device 110 in a streaming manner as well (e.g., as the user provides the spoken utterance 454A).

Figure 4B:
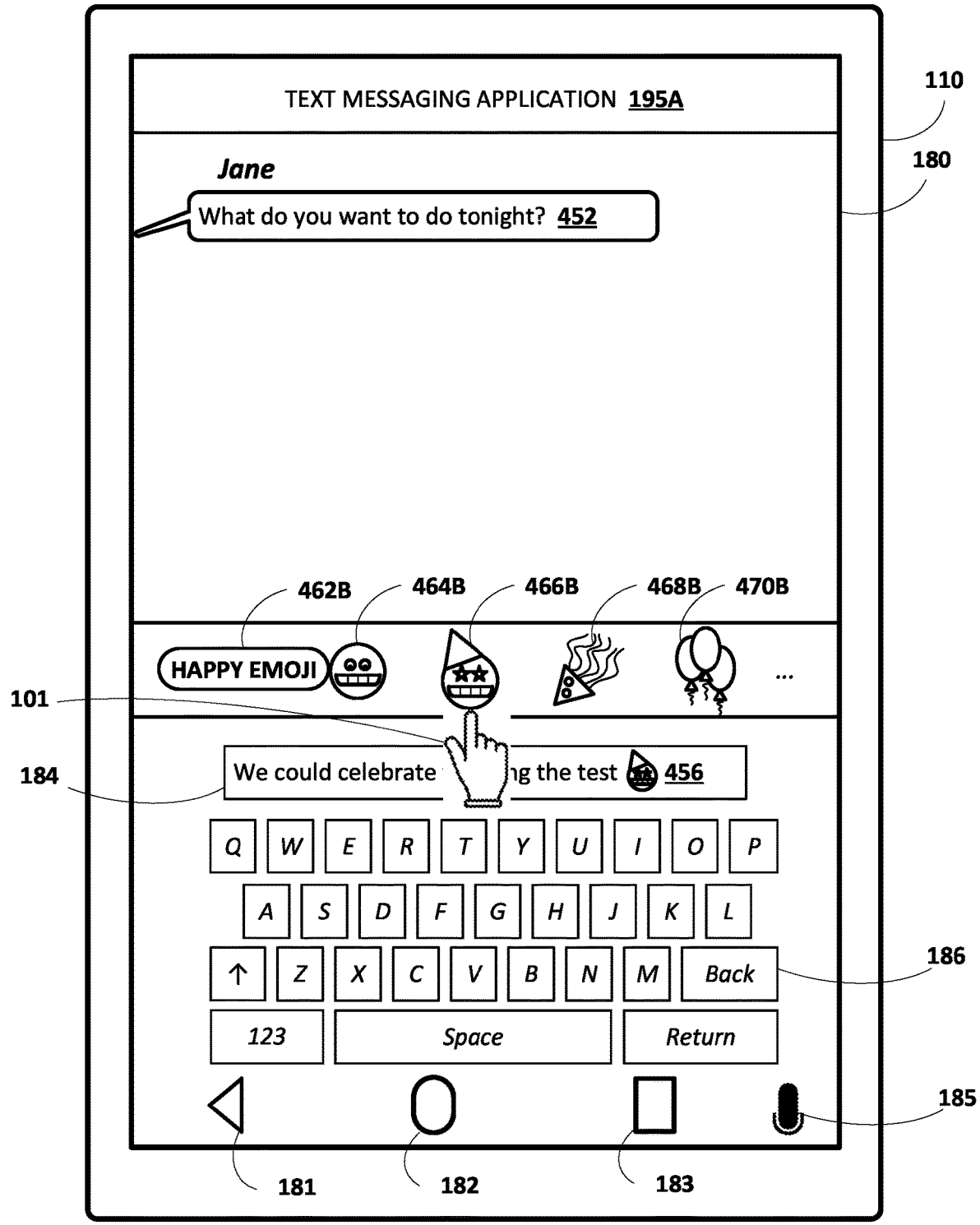

Referring specifically to FIG. 4B, assume that the user of the client device 110, in dictating the text message as the reply electronic communication, provides a spoken utterance 454B of " . . . celebrate finishing the test . . . " that follows the spoken utterance 454A. In the example of FIG. 4B, the automated assistant may process, using an ASR model, audio data that captures the spoken utterance 454B to generate textual data that is predicted to correspond to the spoken utterance 454B (e.g., textual data of "celebrate finishing the test"), and may cause the textual data that is predicted to correspond to the spoken utterance 454B to be incorporated into the transcription 456 as shown in the text entry box 184 of FIG. 4B.

In the example of FIG. 4B, the automated assistant may determine whether the spoken utterance 454B expresses a given emotion class, from among the plurality of disparate emotion classes, and based on the textual data that is predicted to correspond to the spoken utterance 454B and/or the audio data that captures the spoken utterance 454B (e.g., as described with respect to the emotion class engine 151 of FIG. 1). In contrast with the example in FIG. 4A, for the sake of example in FIG. 4B, assume that the automated assistant determines that the spoken utterance 454B expresses a "happy" emotion class as a given emotion class (e.g., "celebrate finishing the test" indicates the spoken utterance 454B expresses that the user is happy as determined using an emotion classifier described with respect to the emotion class engine 151 of FIG. 1). Accordingly, in the example of FIG. 4B and in response to determining that the spoken utterance 454B expresses the "happy" emotion class, the automated assistant may obtain one or more emojis that are stored in association with the "happy" emotion class (e.g., as described with respect to the emoji engine 152 of FIG. 1 and from the emoji(s) database 150A of FIG. 1).

As shown in FIG. 4B, the one or more emojis that are stored in association with the "happy" emotion class and that are visually rendered for presentation to the user via the display 180 of the client device 110 may include, for instance, a "happy face" emoji 464B, a "celebration face" emoji 466B, a "streamers" emoji 468B, and a "balloons" emoji 470B. Further, in various implementations, an identifier 462B (e.g., "happy emoji" identifier in the example of FIG. 4B) of the given emotion class that was determined based on the textual data that is predicted to correspond to the spoken utterance 454B and/or the audio data that captures the spoken utterance 454B may also be visually rendered for presentation to the user via the display 180 of the client device 110. By providing the identifier 462B as shown in FIG. 4B, the user of the client device 110 may be educated with respect to why the one or more emojis were visually rendered for presentation to the user.

Further, in the example of FIG. 4B, the one or more emojis may only be visually rendered for presentation to the user via the display 180 of the client device 110 in response to determining that the user of the client device 110 has paused for a threshold duration of time has lapsed with respect to saying "test" (e.g., as indicated by the " . . . " included in the spoken utterance 454B and as described with respect to the temporal engine 154 of FIG. 1). Put another way, in various implementations, the one or more emojis may only be visually rendered for presentation to the user via the display 180 of the client device 110 when the automated assistant determines that the user may be done dictating the reply electronic communication. In these and other manners, the automated assistant may balance concluding the dictation session in a quick and efficient manner while refraining from distracting the user since the pause may indicate that the user is collecting their thoughts to continue providing additional spoken utterances. However, it should be understood that one or more emojis may be visually rendered for presentation to the user via the display 180 of the client device 110 in a streaming manner as well (e.g., as the user provides the spoken utterance 454B).

Notably, in the example of FIG. 4B, each of the one or more emojis may be selectable by the user of the client device to cause one or more of the emojis to be incorporated into the transcription in a quick and efficient manner. For example, and as shown in FIG. 4B, the user of the client device may direct touch input to a given emoji to cause the given emoji to be incorporated into the transcription 456 (e.g., as indicated by hand 101 directing touch input to the "celebration face" emoji 466B) as shown in FIG. 4B. As another example, and although not depicted, the user of the client device 110 may provide an additional spoken utterance as a user selection of the given emoji. For instance, the user may provide an additional spoken utterance of "add celebration face emoji" to cause the "celebration face" emoji 466B to be incorporated into the transcription 456. In these instances, "celebration face" may be an emoji reference, and speech processing of additional audio data that captures the additional spoken utterance may be biased towards emoji references of the one or more emojis that are visually rendered for presentation to the user of the client device 110 (e.g., as described with respect to the biasing engine 155 of FIG. 1). Also, for instance, the user may provide an additional spoken utterance of "add the second emoji" to cause the "celebration face" emoji 466B to be incorporated into the transcription 456. In these instances, "second emoji" may be an emoji presentation order reference, and the automatic assistant may resolve that "second emoji" references the "celebration face" emoji 466B.

Although FIG. 4B is described with respect to the user only causing one emoji to be incorporated into the transcription, it should be understood that is for the sake of example and is not meant to be limiting. Rather, it should be understood that the techniques described herein enable the user to also incorporate multiple contextually relevant emojis into the transcription 456. Further, one or more additional emojis (if any) that are also stored in association with the "happy" emotion class may supplant the given emoji that is selected to provide additional contextually relevant emojis that may be incorporated into the transcription 456. Moreover, it should be understood that the user may provide additional user inputs to cause one or more additional emojis (if any) that are also stored in association with the "happy" emotion class to be visually rendered for presentation to the user (e.g., based on touch input directed to the ellipses next to the "balloons" emoji 470B, or based on an additional spoken utterance of "show more emojis" or the like). Accordingly, it should be understood that the example depicted in FIG. 4B is provided to illustrate various techniques described herein and is not meant to be limiting.

Figure 4C:
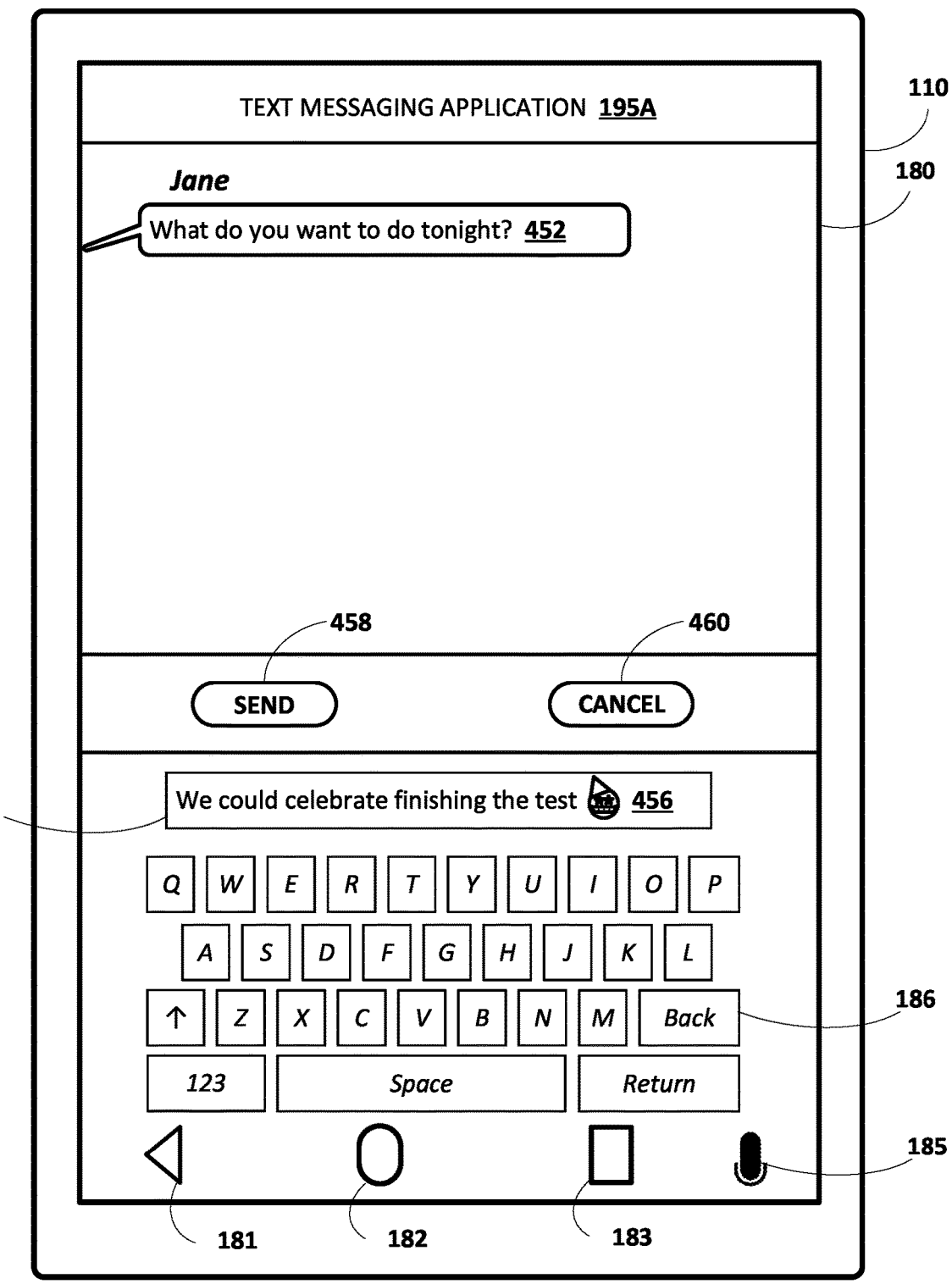

Referring specifically to FIG. 4C, assume that the user of the client device 110, in dictating the text message as the reply electronic communication, pauses subsequent to providing the spoken utterance 454B as indicated by the ellipses included in 454C and subsequent to causing the "celebration face" emoji 466B to be incorporated into the transcription 456. In the example of FIG. 4C, the automated assistant may cause the one or more commands (e.g., represented by the "send" selectable element 458 and the "cancel" selectable element 460 described with respect to FIG. 4A) to supplant the one or more emojis that are stored in association with the "happy" emotion class. In various implementations, the one or more commands may only be visually rendered for presentation to the user via the display 180 of the client device 110 in response to determining that the user of the client device 110 has not provided any additional spoken utterances and that a threshold duration of time has lapsed with respect to the user selection of the "celebration face" emoji 466B. Put another way, even after the user selection of the "celebration face" emoji 466B, the user of the client device 110 may still be provided an opportunity to select one or more given additional emojis that, when selected, are also incorporated into the transcription 456. However, if not additional user selection is provided by the user, then the automated assistant may supplant the one or more emojis with the one or more commands in an effort to conclude the dictation session in a more quick and efficient manner.

Figure 4D:
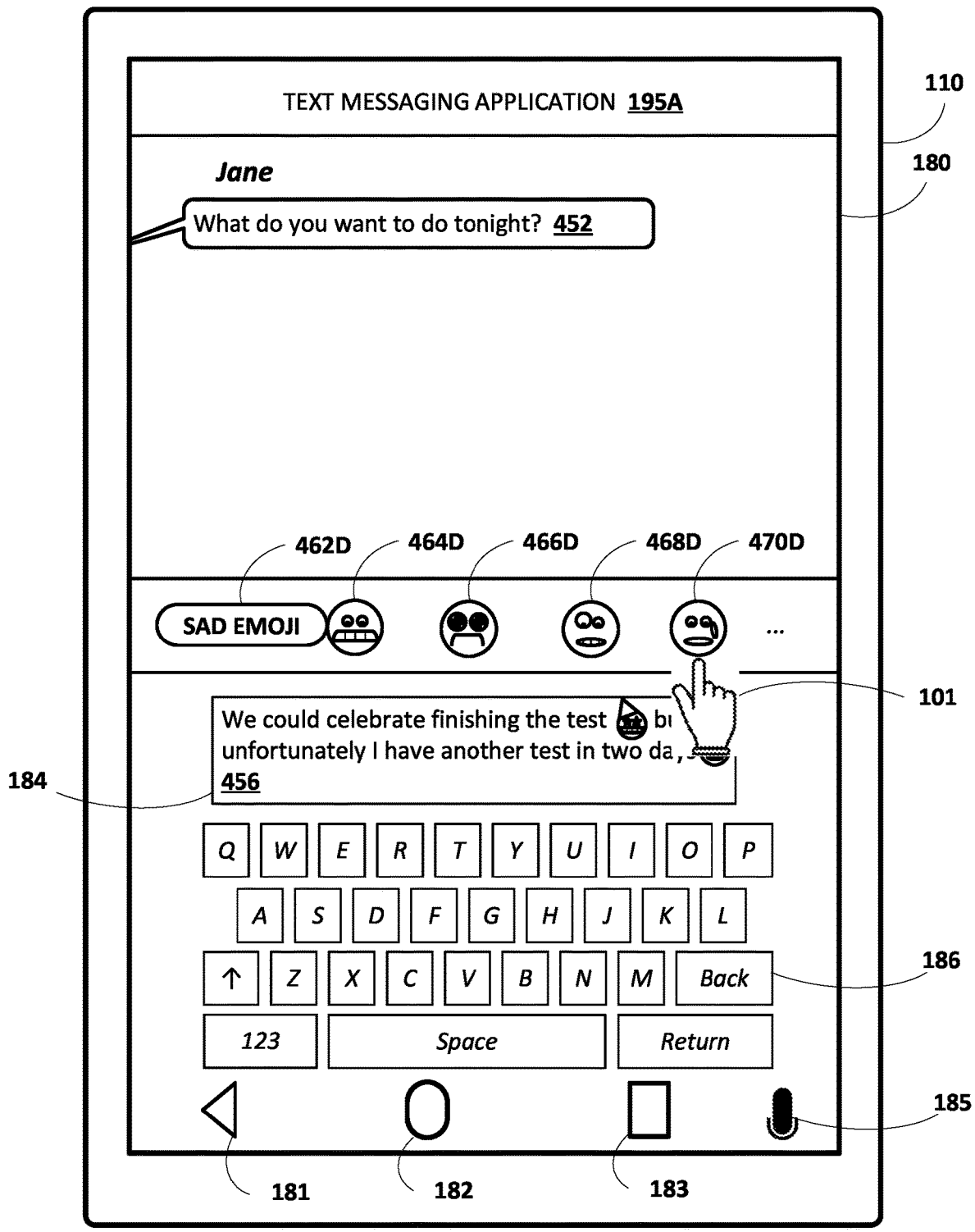

Referring specifically to FIG. 4D, assume that the user of the client device 110, in dictating the text message as the reply electronic communication, provides a spoken utterance 454D of " . . . but unfortunately I have another test in two days . . . " that follows the spoken utterance 454B and the pause as indicated by 454C. In the example of FIG. 4D, the automated assistant may process, using an ASR model, audio data that captures the spoken utterance 454D to generate textual data that is predicted to correspond to the spoken utterance 454D (e.g., textual data of "but unfortunately I have another test in two days"), and may cause the textual data that is predicted to correspond to the spoken utterance 454D to be incorporated into the transcription 456 as shown in the text entry box 184 of FIG. 4D.

Similar to the example of FIGS. 4A and 4B, in the example of FIG. 4D, the automated assistant may determine whether the spoken utterance 454D expresses a given emotion class, from among the plurality of disparate emotion classes and independent of the "happy" emotion class determined in the example of FIG. 4B, and based on the textual data that is predicted to correspond to the spoken utterance 454D and/or the audio data that captures the spoken utterance 454D (e.g., as described with respect to the emotion class engine 151 of FIG. 1). In contrast with the example in FIGS. 4A and 4B, for the sake of example in FIG. 4D, assume that the automated assistant determines that the spoken utterance 454D expresses a "sad" emotion class as a given emotion class (e.g., "but unfortunately I have another test in two days" indicates the spoken utterance 454D expresses that the user is sad as determined using an emotion classifier described with respect to the emotion class engine 151 of FIG. 1). Accordingly, in the example of FIG. 4D and in response to determining that the spoken utterance 454D expresses the "sad" emotion class, the automated assistant may obtain one or more emojis that are stored in association with the "sad" emotion class (e.g., as described with respect to the emoji engine 152 of FIG. 1 and from the emoji(s) database 150A of FIG. 1).

As shown in FIG. 4D, the one or more emojis that are stored in association with the "sad" emotion class and that are visually rendered for presentation to the user via the display 180 of the client device 110 may include, for instance, a "sad face" emoji 464D, a "disconcerted face" emoji 466D, a "sad eyes" emoji 468D, and a "crying face" emoji 470D. Further, in various implementations, an identifier 462D (e.g., "sad emoji" identifier in the example of FIG. 4D) of the given emotion class that was determined based on the textual data that is predicted to correspond to the spoken utterance 454D and/or the audio data that captures the spoken utterance 454D may also be visually rendered for presentation to the user via the display 180 of the client device 110. By providing the identifier 462D as shown in FIG. 4D, the user of the client device 110 may be educated with respect to why the one or more emojis were visually rendered for presentation to the user.

In the example of FIG. 4D, the one or more emojis may only be visually rendered for presentation to the user via the display 180 of the client device 110 in response to determining that the user of the client device 110 has paused for a threshold duration of time has lapsed with respect to saying "days" (e.g., as indicated by the " . . . " included in the spoken utterance 454D and as described with respect to the temporal engine 154 of FIG. 1). Put another way, in various implementations, the one or more emojis may only be visually rendered for presentation to the user via the display 180 of the client device 110 when the automated assistant determines that the user may be done dictating the reply electronic communication. In these and other manners, and as also described with respect to FIG. 4B, the automated assistant may balance concluding the dictation session in a quick and efficient manner while refraining from distracting the user since the pause may indicate that the user is collecting their thoughts to continue providing additional spoken utterances. However, it should be understood that one or more emojis may be visually rendered for presentation to the user via the display 180 of the client device 110 in a streaming manner as well (e.g., as the user provides the spoken utterance 454D).

Notably, in the example of FIG. 4D, each of the one or more emojis may also be selectable by the user of the client device to cause one or more of the emojis to be incorporated into the transcription in a quick and efficient manner. For example, and as shown in FIG. 4D, the user of the client device may direct touch input to a given emoji to cause the given emoji to be incorporated into the transcription 456 (e.g., as indicated by the hand 101 directing touch input to the "crying face" emoji 470D) as shown in FIG. 4D. As another example, and although not depicted, the user of the client device 110 may provide an additional spoken utterance as a user selection of the given emoji in the same or similar manner described with respect to FIG. 4B.

Although FIG. 4D is also described with respect to the user only causing one emoji to be incorporated into the transcription, it should be understood that is also for the sake of example and is not meant to be limiting. Rather, it should be understood that the techniques described herein enable the user to also incorporate multiple contextually relevant emojis into the transcription 456. Further, one or more additional emojis (if any) that are also stored in association with the "sad" emotion class may supplant the given emoji that is selected to provide additional contextually relevant emojis that may be incorporated into the transcription 456. Moreover, it should be understood that the user may provide additional user inputs to cause one or more additional emojis (if any) that are also stored in association with the "sad" emotion class to be visually rendered for presentation to the user (e.g., based on touch input directed to the ellipses next to the "crying face" emoji 470D, or based on an additional spoken utterance of "show more emojis" or the like). Accordingly, it should be understood that the example depicted in FIG. 4D is provided to illustrate various techniques described herein and is not meant to be limiting.

Figure 4E:
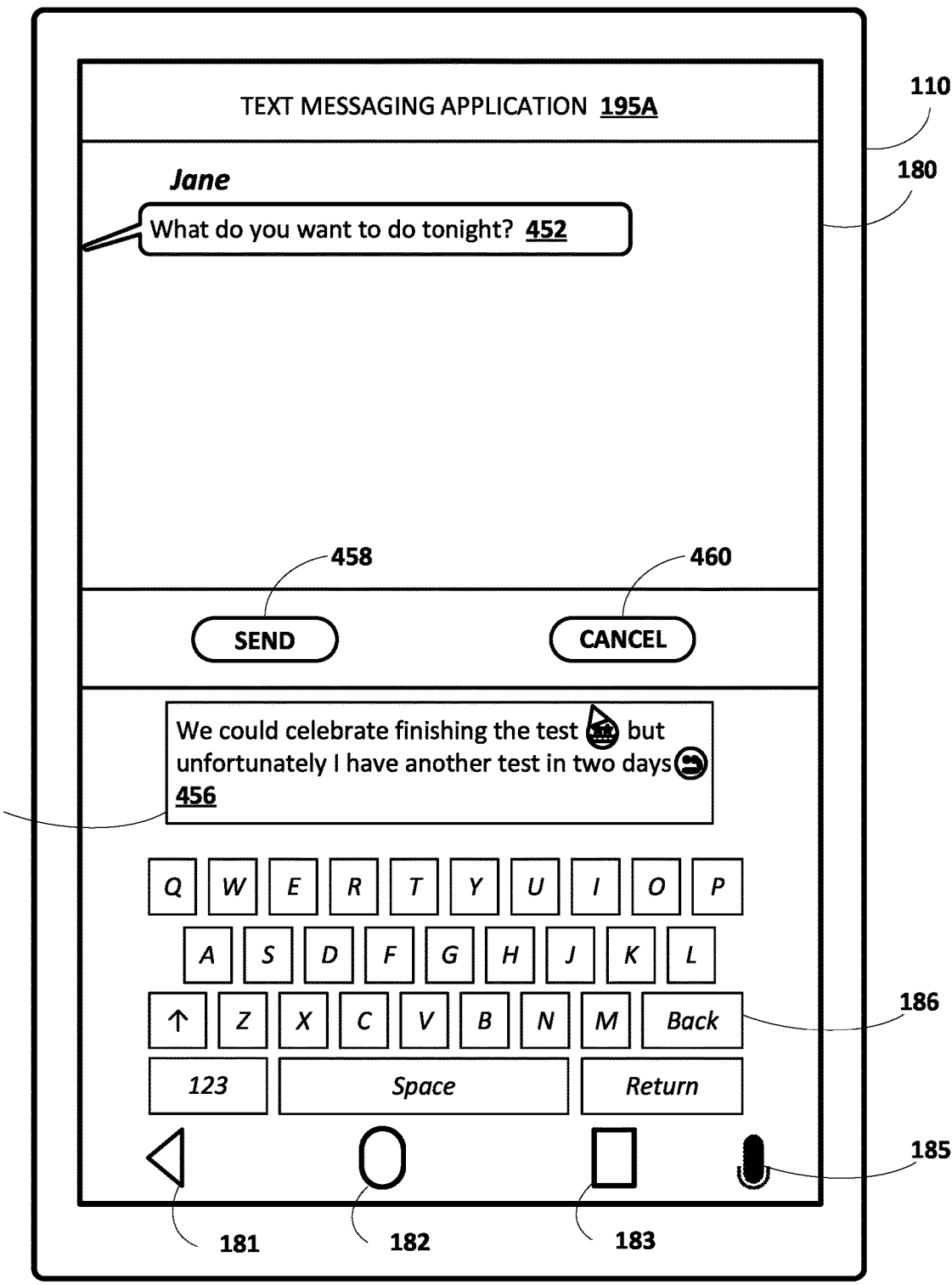

Referring specifically to FIG. 4E, assume that the user of the client device 110, in dictating the text message as the reply electronic communication, pauses subsequent to providing the spoken utterance 454D as indicated by the ellipses included in 454E and subsequent to causing the "crying face" emoji 470D to be incorporated into the transcription 456. Similar to the example in FIG. 4C, in the example of FIG. 4E, the automated assistant may cause the one or more commands (e.g., represented by the "send" selectable element 458 and the "cancel" selectable element 460 described with respect to FIG. 4A) to supplant the one or more emojis that are stored in association with the "sad" emotion class. In various implementations, the one or more commands may only be visually rendered for presentation to the user via the display 180 of the client device 110 in response to determining that the user of the client device 110 has not provided any additional spoken utterances and that a threshold duration of time has lapsed with respect to the user selection of the "crying face" emoji 470D. Put another way, even after the user selection of the "crying face" emoji 470D, the user of the client device 110 may still be provided an opportunity to select one or more given additional emojis that, when selected, are also incorporated into the transcription 456. However, if not additional user selection is provided by the user, then the automated assistant may supplant the one or more emojis with the one or more commands in an effort to conclude the dictation session in a more quick and efficient manner.

Accordingly, and assuming that the user of the client device 110 has finished dictating the text message as the reply electronic communication, the user may select the "send" selectable element 458 (e.g., touch input directed to the "send" selectable element 458 or an additional spoken utterance of "send") to cause the transcription 456 to be transmitted to the additional client device (e.g., Jane's client device) as the reply electronic communication. Although FIGS. 4A-4E are described with respect to particular examples, it should be understood that is for the sake of describing various techniques disclosed herein, and is not meant to be limiting.

Figure 5A:
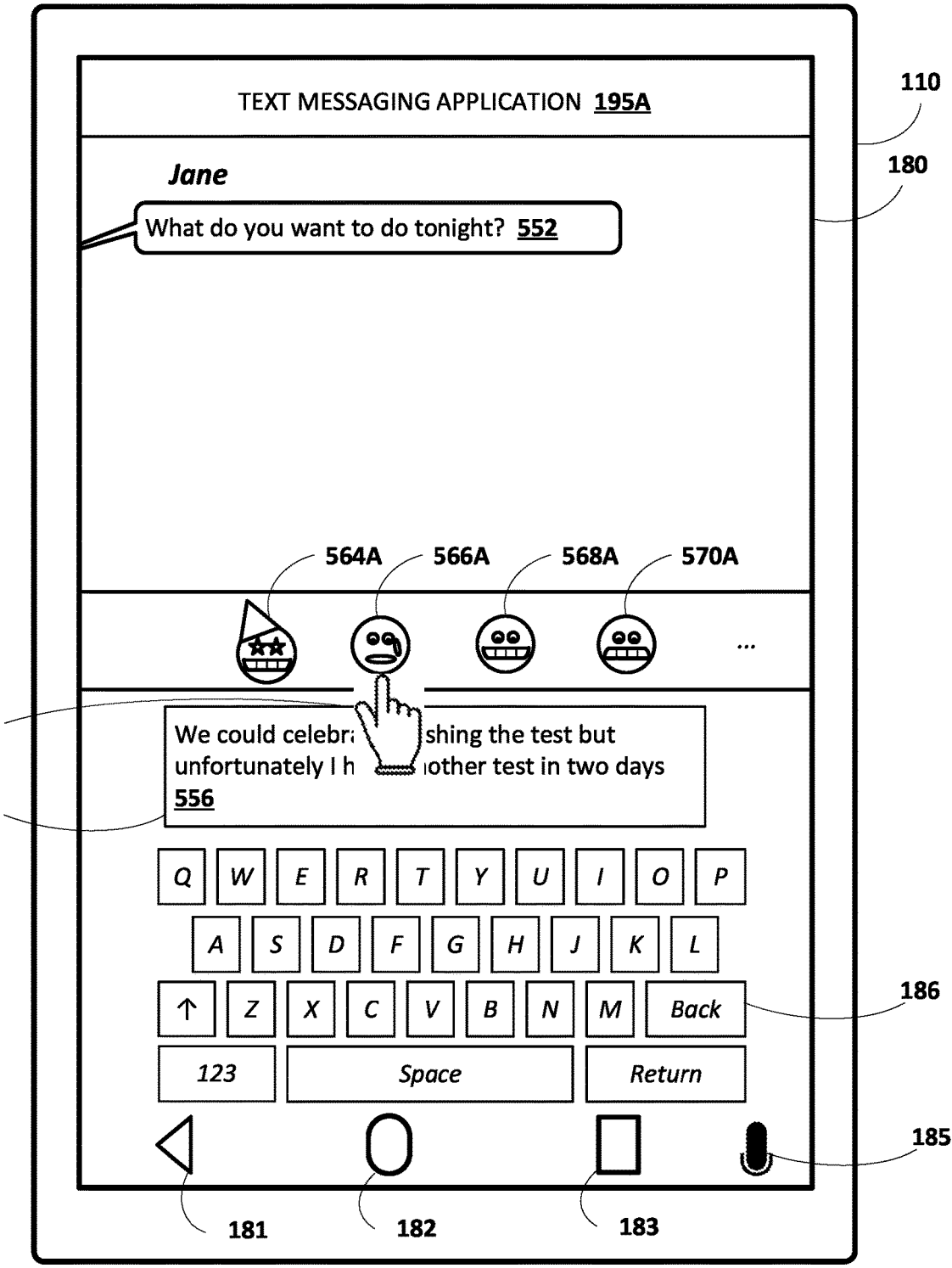
FIG. 5A and FIG. 5B illustrate various non-limiting examples of causing emoji(s) that are stored in association with term(s) of a spoken utterance and/or command(s) to be visually rendered for presentation to a user, in accordance with various implementations.

Referring specifically to FIG. 5A, and in contrast with the examples of FIGS. 4A-4E, assume that the user of the client device 110, in dictating the text message as the reply electronic communication, provides a spoken utterance 554A of "We could celebrate finishing the test but unfortunately I have another text in two days" as a single utterance and without pausing. In the example of FIG. 5A, the automated assistant may process, using an ASR model, audio data that captures the spoken utterance 554A to generate textual data that is predicted to correspond to the spoken utterance 554A (e.g., textual data of "We could celebrate finishing the test but unfortunately I have another text in two days"), and may cause a transcription 556 that includes the textual data to be visually rendered for presentation to the user of the client device 110.

In the example of FIG. 5A, the automated assistant may determine whether the spoken utterance 554A expresses a given emotion class, from among the plurality of disparate emotion classes, and based on the textual data that is predicted to correspond to the spoken utterance 554A and/or the audio data that captures the spoken utterance 554A (e.g., as described with respect to the emotion class engine 151 of FIG. 1). In contrast with the examples in FIGS. 4A-4E, for the sake of example in FIG. 5A, assume that the automated assistant determines that the spoken utterance 554A expresses multiple emotion classes—a "happy" emotion class (e.g., based on "celebrate finishing the test" indicating the spoken utterance 554A expresses that the user is happy as determined using an emotion classifier described with respect to the emotion class engine 151 of FIG. 1) and a "sad" emotion class (e.g., based on "but unfortunately I have another test in two days" indicating the spoken utterance 554A expresses that the user is also sad as determined using an emotion classifier described with respect to the emotion class engine 151 of FIG. 1). Accordingly, in the example of FIG. 5A and in response to determining that the spoken utterance 554A expresses both the "happy" emotion class and the "sad" emotion class, the automated assistant may obtain one or more emojis that are stored in association with one or more of the terms included in the spoken utterance 554A in lieu of one or more emojis that are stored in association with either of the multiple emotion classes (e.g., as described with respect to the emoji engine 152 of FIG. 1 and from the emoji(s) database 150A of FIG. 1).

As shown in FIG. 5A, the one or more emojis that are stored in association with the term "celebrate" that is included in the spoken utterance 554A and that are visually rendered for presentation to the user via the display 180 of the client device 110 may include, for instance, a "celebration face" emoji 564A and a "happy face" emoji 568A, whereas the one or more emojis that are stored in association with the term "unfortunately" that is included in the spoken utterance 554A and that are visually rendered for presentation to the user via the display 180 of the client device 110 may include, for instance, a "crying face" emoji 566A and a "sad face" emoji 570A. Further, in various implementations, and although not depicted in FIG. 5A, an identifier for the one or more terms associated with the one or more emojis (e.g., a "celebrate" identifier and an "unfortunately" identifier) may also be visually rendered for presentation to the user via the display 180 of the client device 110. By providing these identifiers, the user of the client device 110 may be educated with respect to why the one or more emojis were visually rendered for presentation to the user.

Further, in the example of FIG. 5A, the one or more emojis may only be visually rendered for presentation to the user via the display 180 of the client device 110 in response to determining that the user of the client device 110 has paused for a threshold duration of time has lapsed with respect to saying "days" (e.g., as described with respect to the temporal engine 154 of FIG. 1). Put another way, in various implementations, the one or more emojis may only be visually rendered for presentation to the user via the display 180 of the client device 110 when the automated assistant determines that the user may be done dictating the reply electronic communication. In these and other manners, the automated assistant may balance concluding the dictation session in a quick and efficient manner while refraining from distracting the user. However, it should be understood that one or more emojis may be visually rendered for presentation to the user via the display 180 of the client device 110 in a streaming manner as well (e.g., as the user provides the spoken utterance 554A).

Notably, in the example of FIG. 5A, each of the one or more emojis may also be selectable by the user of the client device to cause one or more of the emojis to be incorporated into the transcription in a quick and efficient manner. For example, and as shown in FIG. 5A, the user of the client device may direct touch input to a given emoji to cause the given emoji to be incorporated into the transcription 556 (e.g., as indicated by hand 101 directing touch input to the "crying face" emoji 566A) as shown in FIG. 5A. As another example, and although not depicted, the user of the client device 110 may provide an additional spoken utterance as a user selection of the given emoji (e.g., as described with respect to FIG. 4B).

Although FIG. 5A is described with respect to the user only causing one emoji to be incorporated into the transcription, it should be understood that is for the sake of example and is not meant to be limiting. Rather, it should be understood that the techniques described herein enable the user to also incorporate multiple contextually relevant emojis into the transcription 556. Further, one or more additional emojis (if any) that are also stored in association with the terms (e.g., "celebrate" and/or "unfortunately") and/or other terms of the spoken utterance 554A may supplant the given emoji that is selected to provide additional contextually relevant emojis that may be incorporated into the transcription 556. Moreover, it should be understood that the user may provide additional user inputs to cause one or more additional emojis (if any) that are also stored in association with the terms (e.g., "celebrate" and/or "unfortunately") and/or other terms of the spoken utterance 554A to be visually rendered for presentation to the user (e.g., based on touch input directed to the ellipses next to the "sad face" emoji 570A, or based on an additional spoken utterance of "show more emojis" or the like). Accordingly, it should be understood that the example depicted in FIG. 5A is provided to illustrate various techniques described herein and is not meant to be limiting.

Moreover, although FIG. 5A is described with respect to only causing the one or more emojis that are associated with the one or more terms of the spoken utterance 554A to be visually rendered for presentation to the user, it should be understood that is also for the sake of example and is not meant to be limiting. For instance, one or more emojis that are stored in association with the "happy" emotion class and one or more emojis stored in association with the "sad" emotion class may alternatively be provided, and optionally along with the corresponding identifiers associated with these emotion classes. However, in some instances, this may result in more real estate of the display 180 being consumed and detract from the user experience. As a result, techniques described herein may prioritize causing the one or more emojis that are associated with the one or more terms of the spoken utterance 554A to be visually rendered for presentation to the user.

Figure 5B:
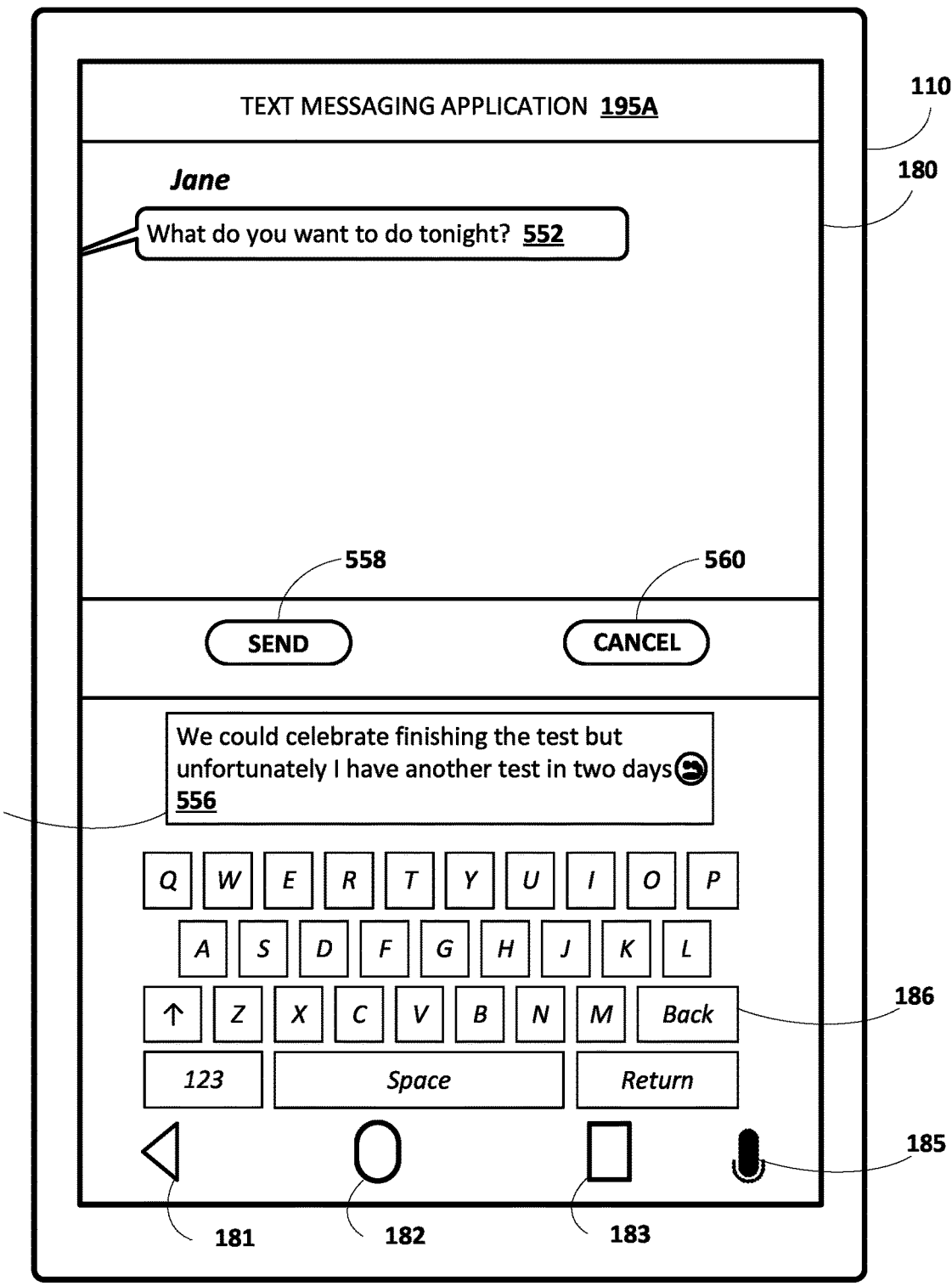

Referring specifically to FIG. 5B, assume that the user of the client device 110, in dictating the text message as the reply electronic communication, pauses subsequent to providing the spoken utterance 554A as indicated by the ellipses included in 554B and subsequent to causing the "crying face" emoji 566A to be incorporated into the transcription 556. In the example of FIG. 5B, the automated assistant may cause the one or more commands (e.g., represented by a "send" selectable element 558 and a "cancel" selectable element 560 described with respect to FIG. 4A) to supplant the one or more emojis. In various implementations, the one or more commands may only be visually rendered for presentation to the user via the display 180 of the client device 110 in response to determining that the user of the client device 110 has not provided any additional spoken utterances and that a threshold duration of time has lapsed with respect to the user selection of the "crying face" emoji 566A. Put another way, even after the user selection of the "crying face" emoji 566A, the user of the client device 110 may still be provided an opportunity to select one or more given additional emojis that, when selected, are also incorporated into the transcription 556. However, if not additional user selection is provided by the user, then the automated assistant may supplant the one or more emojis with the one or more commands in an effort to conclude the dictation session in a more quick and efficient manner.

Accordingly, and assuming that the user of the client device 110 has finished dictating the text message as the reply electronic communication, the user may select the "send" selectable element 558 (e.g., touch input directed to the "send" selectable element 558 or an additional spoken utterance of "send") to cause the transcription 556 to be transmitted to the additional client device (e.g., Jane's client device) as the reply electronic communication. Although FIGS. 5A-5B are described with respect to particular examples, it should be understood that is for the sake of describing various techniques disclosed herein, and is not meant to be limiting.

Figure 6:
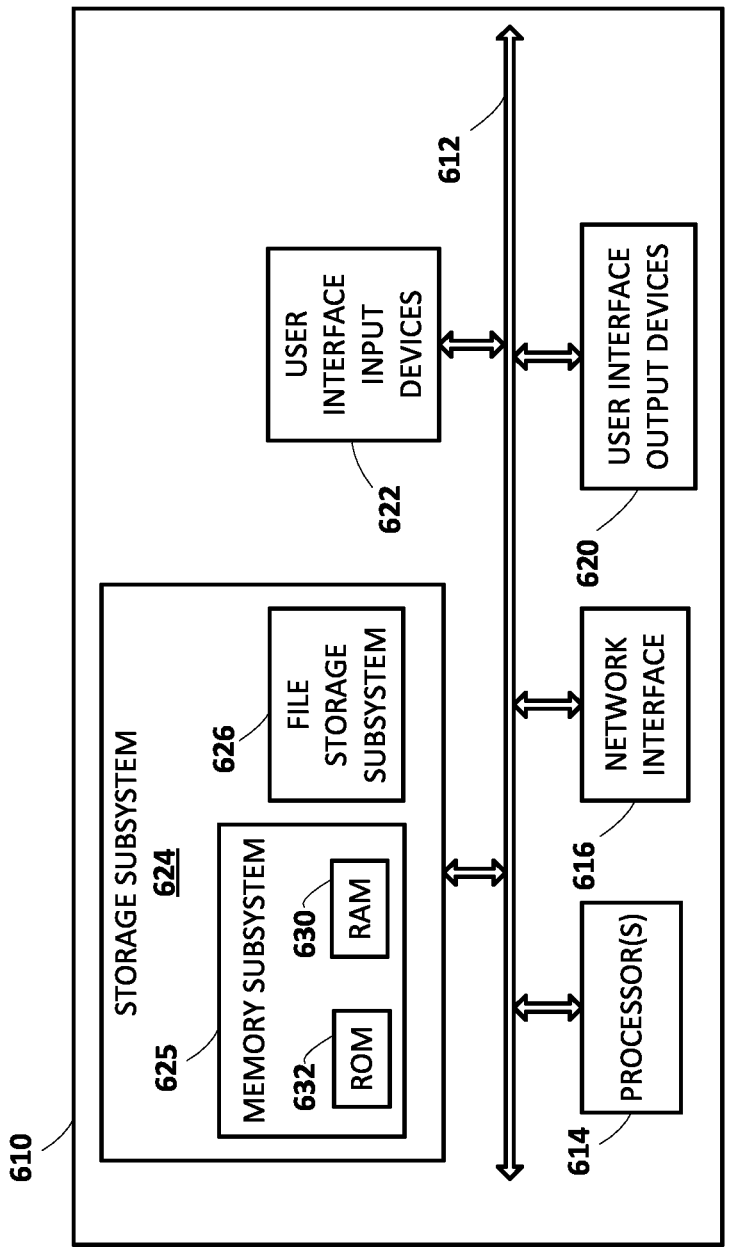
FIG. 6 illustrates an example architecture of a computing device, in accordance with various implementations.

Turning now to FIG. 6, a block diagram of an example computing device 610 that may optionally be utilized to perform one or more aspects of techniques described herein is depicted. In some implementations, one or more of the client device 110, the dictation system 160, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods described herein, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

In some implementations, a method implemented by one or more processors is provided, and includes receiving audio data that captures a spoken utterance of a user of a client device, the audio data being generated by one or more microphones of the client device; processing, using an automatic speech recognition (ASR) model, the audio data that captures the spoken utterance of the user to generate textual data that is predicted to correspond to the spoken utterance; causing a transcription that includes the textual data that is predicted to correspond to the spoken utterance to be visually rendered for presentation to the user via a display of the client device; determining, based on processing the textual data that is predicted to correspond to the spoken utterance, whether the spoken utterance expresses a given emotion class from among a plurality of disparate emotion classes; and in response to determining that the spoken utterance expresses a given emotion class from among the plurality of disparate emotion classes: causing one or more emojis stored in association with the given emotion class to be visually rendered for presentation to the user via the display of the client device. Each of the one or more emojis is selectable, and a user selection of a given emoji, of the one or more emojis, causes the given emoji to be incorporated into the transcription that includes the textual data that is predicted to correspond to the spoken utterance.

These and other implementations of the technology disclosed herein can include one or more of the following features.

In some implementations, the method may further include, in response to determining that the spoken utterance does not express a given emotion class from among the plurality of disparate emotion classes: determining, based on the textual data that is predicted to correspond to the spoken utterance, whether the spoken utterance includes one or more terms that are stored in association with a corresponding emoji; and in response to determining that the spoken utterance includes one or more terms that are stored in association with a corresponding emoji: causing one or more of corresponding emojis that are stored in association with one or more of the terms included in the spoken utterance to be visually rendered for presentation to the user via the display of the client device.

In some versions of those implementations, the method may further include, in response to determining that the spoken utterance does not include any terms that are stored in association with a corresponding emoji: causing one or more commands that are associated with the transcription to be visually rendered for presentation to the user via the display of the client device.

In some implementations, the method may further include, in response to determining that the spoken utterance does not express a given emotion class from among the plurality of disparate emotion classes: causing one or more commands that are associated with the transcription to be visually rendered for presentation to the user via the display of the client device.

In some implementations, determining whether the spoken utterance expresses a given emotion class from among a plurality of disparate emotion classes based on processing the textual data that is predicted to correspond to the spoken utterance may include processing, using an emotion classifier, the textual data that is predicted to correspond to the spoken utterance to generate emotion classifier output; determining, based on the emotion classifier output, a confidence value for the given emotion class; and determining whether the spoken utterance expresses the given emotion class based on the confidence value for the given emotion class.

In some versions of those implementations, determining that the spoken utterance expresses the given emotion class may be based on the confidence value for the given emotion class satisfying a first threshold confidence value. In some further versions of those implementations, causing the one or more emojis stored in association with the given emotion class to be visually rendered for presentation to the user may be based on the confidence value associated with the given emotion class satisfying the first threshold confidence value. In yet further versions of those implementations, causing the one or more emojis stored in association with the given emotion class to be visually rendered for presentation to the user may be further based on a threshold duration of time lapsing with respect to the user providing the spoken utterance.

In additional or alternative versions of those implementations, the method may further include processing, using the emotion classifier, the audio data that captures the spoken utterance to generate the emotion classifier output.

In additional or alternative versions of those implementations, the method may further include, in response to determining that the spoken utterance expresses multiple emotion classes from among the plurality of emotion classes: determining, based on the textual data that is predicted to correspond to the spoken utterance, whether the spoken utterance includes one or more terms that are associated with a corresponding emoji; and in response to determining that the spoken utterance includes one or more terms that are associated with a corresponding emoji: causing one or more of the corresponding emojis that are associated with one or more of the terms included in the spoken utterance to be visually rendered for presentation to the user via the display of the client device. In some further versions of those implementations, the multiple emotion classes may include the given emotion class and a given additional emotion class, and determining that the spoken utterance expresses the multiple emotion classes may be based on both the confidence value for the given emotion class and an additional confidence value for the given additional emotion class, that is determined based on the emotion classifier output, failing to satisfy a first threshold confidence level, but satisfying a second threshold confidence threshold.

In some implementations, the method may further include, in response to the user selection of the given emoji being received: causing the given emoji to be incorporated into the transcription that includes the textual data that is predicted to correspond to the spoken utterance.

In some versions of those implementations, the user selection of the given emoji may include touch input directed to the given emoji.

In additional or alternative versions of those implementations, the user selection of the given emoji may include an additional spoken utterance directed to a given emoji reference for the given emoji. In some further versions of those implementations, the method may further include receiving additional audio data that captures the additional spoken utterance of the user, the additional audio data being generated by the one or more microphones of the client device; and processing, using the ASR model, the additional audio data that captures the additional spoken utterance of the user to identify the given emoji reference for the given emoji. The processing of the additional audio data and using the ASR model may be biased towards corresponding emoji references, including the given emoji reference, for each of the one or more emojis that are visually rendered for presentation to the user via the display of the client device. In yet further versions of those implementations, the user selection of the given emoji may include an additional spoken utterance directed to a given emoji presentation order for the given emoji with respect to the one or more emojis that are visually rendered for presentation to the user via the display of the client device.

In additional or alternative versions of those implementations, the method may further include, in response to an additional user selection of a given additional emoji being received: causing the given additional emoji to be incorporated into the transcription that includes the textual data that is predicted to correspond to the spoken utterance and the given emoji.

In some implementations, the method may further include, in response to no user selection of any emoji, included in the one or more emojis, being received within a threshold duration of time of the subset of the one or more emojis being visually rendered for presentation to the user via the display of the client device: causing the subset of the plurality of the emojis to be removed from the display of the client device.

In some implementations, the method may further include, in response to no user selection of any emoji, included in the one or more emojis, being received within a threshold duration of time of the subset of the one or more emojis being visually rendered for presentation to the user via the display of the client device: causing the one or more emojis to be supplanted with one or more commands that are associated with the transcription that is visually rendered for presentation to the user via the display of the client device.

In some implementations, the method may further include causing an indication of the given emotion class to be visually rendered for presentation to the user via the display of the client device and alongside the one or more emojis. In some versions of those implementations, the transcript may be visually rendered for presentation to the user via a first portion of the display of the client device, the one or more emojis and the indication of the given emotion class may be visually rendered for presentation to the user via a second portion of the display of the client device, and the second portion of the display of the client device may be distinct from the first portion of the display of the client device. \

In some implementations, a method implemented by one or more processors is provided, and includes, during a dictation session between a user of a client device and an automated assistant executing at least in part at the client device: receiving audio data that captures a spoken utterance of the user, the audio data being generated by one or more microphones of the client device; processing, using an automatic speech recognition (ASR) model, the audio data that captures the spoken utterance of the user to generate textual data that is predicted to correspond to the spoken utterance; causing a transcription that includes the textual data that is predicted to correspond to the spoken utterance to be visually rendered for presentation to the user via a display of the client device; identifying, based on processing the textual data that is predicted to correspond to the spoken utterance, a given emotion class, from among a plurality of disparate emotion classes, that is expressed by the spoken utterance; and causing one or more emojis that are stored in association with the given emotion class to be visually rendered for presentation to the user via the display of the client device. The method further includes, during the dictation session between the user of the client device and the automated assistant, and subsequent to causing the one or more emojis that are stored in association with the given emotion class to be visually rendered for presentation to the user: receiving additional audio data that captures an additional spoken utterance of the user, the additional audio data being generated by the one or more microphones of the client device; processing, using the ASR model, the additional audio data that captures the additional spoken utterance of the user to generate additional textual data that is predicted to correspond to the additional spoken utterance; causing the transcription that includes the textual data that is predicted to correspond to the spoken utterance to incorporate the additional textual data that is predicted to correspond to the additional spoken utterance via the display of the client device; identifying, based on processing the additional textual data that is predicted to correspond to the additional spoken utterance and independent of the textual data that is predicted to correspond to the spoken utterance, a given additional emotion class, from among the plurality of disparate emotion classes and that is distinct from the given emotion class, that is expressed by the additional spoken utterance; and causing one or more additional emojis that are stored in association with the given additional emotion class to be visually rendered for presentation to the user via the display of the client device, one or more of the additional emojis that are stored in association with the given additional emotion class being distinct from one or more of the emojis that are stored in association with the given emotion class.

These and other implementations of the technology disclosed herein can include one or more of the following features.

In some implementations, causing the one or more emojis that are stored in association with the given emotion class to be visually rendered for presentation to the user may be in response to determining that a threshold duration of time has lapsed with respect to the user providing the spoken utterance.

In some implementations, causing the one or more emojis that are stored in association with the given emotion class to be visually rendered for presentation to the user may be in response to receiving a command that is associated with the transcription.

In some versions of those implementations, the command may include touch input of the user that is directed to the transcription.

In additional or alternative versions of those implementations, the command may include a voice command spoken utterance of the user that is directed to the transcription. In some further versions of those implementations, the method may further include receiving voice command audio data that captures the voice command spoken utterance of the user, the voice command audio data being generated by the one or more microphones of the client device; and processing, using the ASR model, the voice command audio data that captures the voice command spoken utterance of the user to identify the command.

In some implementations, the method may further include, in response to determining that the dictation session between the user of the client device and the automated assistant has concluded: causing one or more commands that are associated with the transcription to be visually rendered for presentation to the user via the display of the client device.

In some implementations, the method may further include, in response to determining that the dictation session between the user of the client device and the automated assistant has concluded: automatically transmitting the transcription to an additional client device of an additional user as an electronic communication and on behalf of the user of the client device. In some versions of those implementations, the electronic communication may be a text message, an email message, or a social media message.

In some implementations, a method implemented by one or more processors is provided, and includes, during a dictation session between a user of a client device and an automated assistant executing at least in part at the client device: receiving audio data that captures a spoken utterance of the user, the audio data being generated by one or more microphones of the client device; processing, using an automatic speech recognition (ASR) model, the audio data that captures the spoken utterance of the user to generate textual data that is predicted to correspond to the spoken utterance; causing a transcription that includes the textual data that is predicted to correspond to the spoken utterance to be visually rendered for presentation to the user via a display of the client device; identifying, based on processing the textual data that is predicted to correspond to the spoken utterance, a given emotion class, from among a plurality of disparate emotion classes, that is expressed by the spoken utterance; and causing one or more emojis that are stored in association with the given emotion class to be visually rendered for presentation to the user via the display of the client device. The method further includes, during a subsequent dictation session between the user of the client device and the automated assistant, that is subsequent to the dictation session: receiving additional audio data that captures an additional spoken utterance of the user, the additional audio data being generated by the one or more microphones of the client device; processing, using the ASR model, the additional audio data that captures the additional spoken utterance of the user to generate additional textual data that is predicted to correspond to the additional spoken utterance; causing an additional transcription that includes the additional textual data corresponding to the additional spoken utterance to be visually rendered for presentation to the user via the display of the client device; identifying, based on processing the additional textual data that is predicted to correspond to the additional spoken utterance, the given emotion class that is also expressed by the additional spoken utterance; and causing one or more additional emojis that are stored in association with the given emotion class to be visually rendered for presentation to the user via the display of the client device, the one or more additional emojis including at least one unique emoji that was not included in the one or more emojis, and the at least one unique emoji being included the one or more additional emojis based on usage of the at least one unique emoji subsequent to the dictation session and prior to the subsequent dictation session.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
   during a dictation session between a user of a client device and an automated assistant executing at least in part at the client device:
      receiving audio data that captures a spoken utterance of the user of the client device, the audio data being generated by one or more microphones of the client device;
      processing, using an automatic speech recognition (ASR) model, the audio data that captures the spoken utterance of the user to generate textual data that is predicted to correspond to the spoken utterance;
      causing a transcription that includes the textual data that is predicted to correspond to the spoken utterance to be visually rendered for presentation to the user via a display of the client device;
      determining, based on processing the textual data that is predicted to correspond to the spoken utterance, whether the spoken utterance expresses a given emotion class from among a plurality of disparate emotion classes; and
      in response to determining that the spoken utterance expresses a given emotion class from among the plurality of disparate emotion classes:
         causing one or more emojis stored in association with the given emotion class to be visually rendered for presentation to the user via the display of the client device,
            wherein each of the one or more emojis is selectable,
            wherein a user selection of a given emoji, of the one or more emojis, causes the given emoji to be incorporated into the transcription that includes the textual data that is predicted to correspond to the spoken utterance, and
            wherein the one or more emojis are rendered in a portion of the display that is visually distinct from the transcription that includes the textual data that is predicted to correspond to the spoken utterance;
         determining whether the user selection of the given emoji is received;
         in response to determining the user selection of the given emoji is received:
            causing the given emoji to be incorporated into the transcription that includes the textual data that is predicted to correspond to the spoken utterance; and
         in response to determining that no user selection of the given emoji is received:
            causing one or more commands that are associated with the transcription to supplant the one or more emojis that are rendered in the portion of the display that is visually distinct from the transcription that includes the textual data that is predicted to correspond to the spoken utterance.

2. The method of claim 1, further comprising:
   in response to determining that the spoken utterance does not express a given emotion class from among the plurality of disparate emotion classes:
      determining, based on the textual data that is predicted to correspond to the spoken utterance, whether the spoken utterance includes one or more terms that are stored in association with one or more corresponding emojis; and
      in response to determining that the spoken utterance includes one or more terms that are stored in association with one or more corresponding emojis:
         causing one or more of the corresponding emojis that are stored in association with one or more of the terms included in the spoken utterance to be visually rendered for presentation to the user via the display of the client device.

3. The method of claim 2, further comprising:
   in response to determining that the spoken utterance does not include any terms that are stored in association with one or more corresponding emojis:
      causing one or more commands that are associated with the transcription to be visually rendered for presentation to the user via the display of the client device.

4. The method of claim 1, further comprising:
   in response to determining that the spoken utterance does not express a given emotion class from among the plurality of disparate emotion classes:
      causing one or more commands that are associated with the transcription to be visually rendered for presentation to the user via the display of the client device.

5. The method of claim 1, wherein determining whether the spoken utterance expresses a given emotion class, from among a plurality of disparate emotion classes based on processing the textual data that is predicted to correspond to the spoken utterance, comprises:
   processing, using an emotion classifier, the textual data that is predicted to correspond to the spoken utterance to generate emotion classifier output;
   determining, based on the emotion classifier output, a confidence value for the given emotion class; and
   determining whether the spoken utterance expresses the given emotion class based on the confidence value for the given emotion class.

6. The method of claim 5, wherein determining that the spoken utterance expresses the given emotion class is based on the confidence value for the given emotion class satisfying a first threshold confidence value.

7. The method of claim 6, wherein causing the one or more emojis stored in association with the given emotion class to be visually rendered for presentation to the user is based on the confidence value associated with the given emotion class satisfying the first threshold confidence value.

8. The method of claim 7, causing the one or more emojis stored in association with the given emotion class to be visually rendered for presentation to the user is further based on a threshold duration of time lapsing with respect to the user providing the spoken utterance.

9. The method of claim 5, further comprising:
processing, using the emotion classifier, the audio data that captures the spoken utterance to generate the emotion classifier output.

10. The method of claim 5, further comprising:
in response to determining that the spoken utterance expresses multiple emotion classes from among the plurality of emotion classes:
determining, based on the textual data that is predicted to correspond to the spoken utterance, whether the spoken utterance includes one or more terms that are associated with one or more corresponding emojis; and
in response to determining that the spoken utterance includes one or more terms that are associated with one or more corresponding emojis:
causing one or more of the corresponding emojis that are associated with one or more of the terms included in the spoken utterance to be visually rendered for presentation to the user via the display of the client device.

11. The method of claim 10, wherein the multiple emotion classes include the given emotion class and a given additional emotion class, and wherein determining that the spoken utterance expresses the multiple emotion classes is based on both the confidence value for the given emotion class and an additional confidence value for the given additional emotion class, that is determined based on the emotion classifier output, failing to satisfy a first threshold confidence value, but satisfying a second threshold confidence value.

12. The method of claim 1, wherein the user selection of the given emoji comprises touch input directed to the given emoji.

13. The method of claim 1, wherein the user selection of the given emoji comprises an additional spoken utterance directed to a given emoji reference for the given emoji.

14. The method of claim 13, further comprising:
receiving additional audio data that captures the additional spoken utterance of the user, the additional audio data being generated by the one or more microphones of the client device; and
processing, using the ASR model, the additional audio data that captures the additional spoken utterance of the user to identify the given emoji reference for the given emoji,
wherein the processing of the additional audio data and using the ASR model is biased towards corresponding emoji references, including the given emoji reference, for each of the one or more emojis that are visually rendered for presentation to the user via the display of the client device.

15. The method of claim 14, wherein the user selection of the given emoji comprises an additional spoken utterance directed to a given emoji presentation order for the given emoji with respect to the one or more emojis that are visually rendered for presentation to the user via the display of the client device.

16. A method implemented by one or more processors, the method comprising:
during a dictation session between a user of a client device and an automated assistant executing at least in part at the client device:
receiving audio data that captures a spoken utterance of the user, the audio data being generated by one or more microphones of the client device;
processing, using an automatic speech recognition (ASR) model, the audio data that captures the spoken utterance of the user to generate textual data that is predicted to correspond to the spoken utterance;
causing a transcription that includes the textual data that is predicted to correspond to the spoken utterance to be visually rendered for presentation to the user via a display of the client device;
identifying, based on processing the textual data that is predicted to correspond to the spoken utterance, a given emotion class, from among a plurality of disparate emotion classes, that is expressed by the spoken utterance; and
causing one or more emojis that are stored in association with the given emotion class to be visually rendered for presentation to the user via the display of the client device,
wherein each of the one or more emojis is selectable,
wherein a user selection of a given emoji, of the one or more emojis, causes the given emoji to be incorporated into the transcription that includes the textual data that is predicted to correspond to the spoken utterance, and
wherein the one or more emojis are rendered in a portion of the display that is visually distinct from the transcription that includes the textual data that is predicted to correspond to the spoken utterance; and
during the dictation session between the user of the client device and the automated assistant, and subsequent to causing the one or more emojis that are stored in association with the given emotion class to be visually rendered for presentation to the user:
receiving additional audio data that captures an additional spoken utterance of the user, the additional audio data being generated by the one or more microphones of the client device;
processing, using the ASR model, the additional audio data that captures the additional spoken utterance of the user to generate additional textual data that is predicted to correspond to the additional spoken utterance;
causing the transcription that includes the textual data that is predicted to correspond to the spoken utterance to incorporate the additional textual data that is predicted to correspond to the additional spoken utterance via the display of the client device;
identifying, based on processing the additional textual data that is predicted to correspond to the additional spoken utterance and independent of the textual data that is predicted to correspond to the spoken utterance, a given additional emotion class, from among the plurality of disparate emotion classes and that is distinct from the given emotion class, that is expressed by the additional spoken utterance; and
causing one or more additional emojis that are stored in association with the given additional emotion class to supplant the one or more emojis that are rendered in the portion of the display that is visually distinct from the transcription that includes the textual data that is predicted to correspond to the spoken utterance, one or more of the additional emojis that are stored in association with the given additional emotion class being distinct from one or more of the emojis that are stored in association with the given emotion class.

17. The method of claim 16, wherein causing the one or more emojis that are stored in association with the given emotion class to be visually rendered for presentation to the user is in response to determining that a threshold duration of time has lapsed with respect to the user providing the spoken utterance.

18. The method of claim 16, wherein causing the one or more emojis that are stored in association with the given emotion class to be visually rendered for presentation to the user is in response to receiving a command that is associated with the transcription.

19. A method implemented by one or more processors, the method comprising:
  during a dictation session between a user of a client device and an automated assistant executing at least in part at the client device:
    receiving audio data that captures a spoken utterance of the user, the audio data being generated by one or more microphones of the client device;
    processing, using an automatic speech recognition (ASR) model, the audio data that captures the spoken utterance of the user to generate textual data that is predicted to correspond to the spoken utterance;
    causing a transcription that includes the textual data that is predicted to correspond to the spoken utterance to be visually rendered for presentation to the user via a display of the client device;
    identifying, based on processing the textual data that is predicted to correspond to the spoken utterance, a given emotion class, from among a plurality of disparate emotion classes, that is expressed by the spoken utterance; and
    causing one or more emojis that are stored in association with the given emotion class to be visually rendered for presentation to the user via the display of the client device,
      wherein each of the one or more emojis is selectable,
      wherein a user selection of a given emoji, of the one or more emojis, causes the given emoji to be incorporated into the transcription that includes the textual data that is predicted to correspond to the spoken utterance, and
      wherein the one or more emojis are rendered in a portion of the display that is visually distinct from the transcription that includes the textual data that is predicted to correspond to the spoken utterance; and
  during a subsequent dictation session between the user of the client device and the automated assistant, that is subsequent to the dictation session:
    receiving additional audio data that captures an additional spoken utterance of the user, the additional audio data being generated by the one or more microphones of the client device;
    processing, using the ASR model, the additional audio data that captures the additional spoken utterance of the user to generate additional textual data that is predicted to correspond to the additional spoken utterance;
    causing an additional transcription that includes the additional textual data corresponding to the additional spoken utterance to be visually rendered for presentation to the user via the display of the client device;
    identifying, based on processing the additional textual data that is predicted to correspond to the additional spoken utterance, the given emotion class that is also expressed by the additional spoken utterance; and
    causing one or more additional emojis that are stored in association with the given emotion class to supplant the one or more emojis that are rendered in the portion of the display that is visually distinct from the transcription that includes the textual data that is predicted to correspond to the spoken utterance, the one or more additional emojis including at least one unique emoji that was not included in the one or more emojis, and the at least one unique emoji being included in the one or more additional emojis based on usage of the at least one unique emoji subsequent to the dictation session and prior to the subsequent dictation session.

\* \* \* \* \*